US011281693B2

(12) United States Patent
Stanfill et al.

(10) Patent No.: US 11,281,693 B2
(45) Date of Patent: *Mar. 22, 2022

(54) MANAGING A COMPUTING CLUSTER USING REPLICATED TASK RESULTS

(71) Applicant: Ab Initio Technology LLC, Lexington, MA (US)

(72) Inventors: Craig W. Stanfill, Lincoln, MA (US); Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/175,487

(22) Filed: Oct. 30, 2018

(65) Prior Publication Data

US 2019/0129751 A1 May 2, 2019

Related U.S. Application Data

(60) Provisional application No. 62/579,225, filed on Oct. 31, 2017.

(51) Int. Cl.
*G06F 16/27* (2019.01)
*G06F 9/54* (2006.01)
(Continued)

(52) U.S. Cl.
CPC .............. *G06F 16/27* (2019.01); *G06F 9/546* (2013.01); *G06F 11/14* (2013.01);
(Continued)

(58) Field of Classification Search
None
See application file for complete search history.

(56) References Cited

U.S. PATENT DOCUMENTS 5,966,072 A * 10/1999 Stanfill ..................... G06F 9/54
340/440
6,615,225 B1 9/2003 Cannon et al.
(Continued)

FOREIGN PATENT DOCUMENTS

WO 2016036627 A1 3/2016
WO 2016044763 A1 3/2016
(Continued)

OTHER PUBLICATIONS

International Preliminary Report on Patentability for PCT/US2018/058211, dated May 2020. (Year: 2020).*
(Continued)

*Primary Examiner* — Qing Yuan Wu
(74) *Attorney, Agent, or Firm* — Occhiuti & Rohlicek LLP

(57) ABSTRACT

A method for processing tasks in a distributed data processing system includes processing sets of tasks. The method includes maintaining, at a first processing node a number of counters including a working counter indicating a current time interval of the number of time intervals in the distributed data processing system, and a replication counter indicating a time interval of the number of time intervals for which at least one of (1) all tasks associated with that time interval, or (2) all corresponding results associated with that time interval, are replicated at multiple processing nodes of the number of processing nodes. The method includes providing messages from the first processing node to the other processing nodes of the number of processing nodes, the messages including the working counter and the replication counter.

14 Claims, 37 Drawing Sheets

(51) Int. Cl.
   *G06F 11/14* (2006.01)
   *G06F 16/23* (2019.01)
   *G06F 9/46* (2006.01)
   *G06F 16/182* (2019.01)

(52) U.S. Cl.
   CPC ...... *G06F 11/1446* (2013.01); *G06F 11/1448* (2013.01); *G06F 11/1458* (2013.01); *G06F 11/1474* (2013.01); *G06F 11/1492* (2013.01); *G06F 16/1824* (2019.01); *G06F 16/2365* (2019.01); *G06F 9/466* (2013.01); *G06F 9/467* (2013.01); *G06F 16/182* (2019.01); *G06F 2221/0795* (2013.01)

(56) References Cited

U.S. PATENT DOCUMENTS

| | | | |
|---|---|---|---|
| 7,103,664 B1 | 9/2006 | Novaes et al. | |
| 7,167,850 B2* | 1/2007 | Stanfill | G06F 9/4494 706/45 |
| 7,293,092 B2 | 11/2007 | Sukegawa | |
| 7,716,630 B2* | 5/2010 | Wholey | G06F 8/34 717/100 |
| 8,381,016 B2 | 2/2013 | Kaminsky | |
| 8,555,018 B1 | 10/2013 | Rohr et al. | |
| 8,935,493 B1 | 1/2015 | Dolan et al. | |
| 8,972,491 B2 | 3/2015 | Abu-Libdeh et al. | |
| 9,002,805 B1 | 4/2015 | Barber et al. | |
| 9,246,996 B1 | 1/2016 | Brooker et al. | |
| 9,256,761 B1 | 2/2016 | Sahu et al. | |
| 9,373,074 B2 | 6/2016 | Levin et al. | |
| 9,384,227 B1 | 7/2016 | Xiao et al. | |
| 9,621,401 B1 | 4/2017 | Wang et al. | |
| 9,965,381 B1 | 5/2018 | Sahin et al. | |
| 10,095,425 B1 | 10/2018 | Martin | |
| 10,127,337 B1 | 11/2018 | Wang et al. | |
| 10,237,149 B1 | 3/2019 | Guo et al. | |
| 10,242,027 B2 | 3/2019 | Johnson et al. | |
| 10,409,920 B1 | 9/2019 | Harwood et al. | |
| 10,474,493 B2 | 11/2019 | Little | |
| 10,803,012 B1 | 10/2020 | Madhavarapu et al. | |
| 2003/0023775 A1 | 1/2003 | Blackmore et al. | |
| 2004/0019624 A1 | 1/2004 | Sukegawa | |
| 2004/0254964 A1* | 12/2004 | Kodama | G06F 16/10 |
| 2006/0085418 A1 | 4/2006 | Piper et al. | |
| 2006/0190243 A1 | 8/2006 | Barkai et al. | |
| 2008/0162590 A1 | 7/2008 | Kundu et al. | |
| 2011/0044209 A1 | 2/2011 | Fachan | |
| 2011/0251997 A1 | 10/2011 | Wang et al. | |
| 2012/0159236 A1 | 6/2012 | Kaminsky | |
| 2012/0303581 A1 | 11/2012 | Calder et al. | |
| 2014/0101225 A1 | 4/2014 | Abu-Libdeh et al. | |
| 2014/0101661 A1 | 4/2014 | Levin et al. | |
| 2014/0143367 A1 | 5/2014 | Dahlin et al. | |
| 2014/0149357 A1 | 5/2014 | Gupta | |
| 2015/0157880 A1 | 6/2015 | Dalbow et al. | |
| 2016/0048408 A1 | 2/2016 | Madhu et al. | |
| 2016/0055225 A1 | 2/2016 | Xu et al. | |
| 2016/0062776 A1* | 3/2016 | Stanfill | G06F 13/36 719/331 |
| 2016/0070771 A1 | 3/2016 | Vermeulen et al. | |
| 2016/0086260 A1 | 3/2016 | Vermeulen et al. | |
| 2016/0110271 A1 | 4/2016 | Stanfill | |
| 2016/0203050 A1 | 7/2016 | Hrle et al. | |
| 2016/0306554 A1 | 10/2016 | Li et al. | |
| 2016/0306581 A1 | 10/2016 | Belgaied et al. | |
| 2016/0380854 A1 | 12/2016 | Gaddis et al. | |
| 2017/0116050 A1 | 4/2017 | Thukkaram et al. | |
| 2017/0177617 A1 | 6/2017 | Johnson et al. | |
| 2017/0177658 A1* | 6/2017 | Lee | G06F 16/273 |
| 2017/0208113 A1 | 7/2017 | Douros et al. | |
| 2017/0212891 A1 | 7/2017 | Pundir et al. | |
| 2017/0257258 A1 | 9/2017 | Bingham et al. | |
| 2017/0302738 A1 | 10/2017 | Dimnaku et al. | |
| 2017/0359243 A1 | 12/2017 | Deuri et al. | |
| 2018/0024853 A1 | 1/2018 | Warfield et al. | |
| 2018/0047002 A1 | 2/2018 | Vermeulen et al. | |
| 2018/0165173 A1 | 6/2018 | Lin et al. | |
| 2018/0173581 A1 | 6/2018 | Vlassarev et al. | |
| 2018/0300174 A1 | 10/2018 | Karanasos et al. | |
| 2019/0102262 A1* | 4/2019 | Sukhomlinov | G06F 11/1448 |
| 2019/0104179 A1 | 4/2019 | Falco et al. | |
| 2019/0155694 A1 | 5/2019 | Fan et al. | |
| 2020/0186602 A1 | 6/2020 | Leshinsky et al. | |
| 2020/0272636 A1 | 8/2020 | Gupta et al. | |

FOREIGN PATENT DOCUMENTS

| | | |
|---|---|---|
| WO | 2016135705 A1 | 9/2016 |
| WO | 2017123849 | 7/2017 |

OTHER PUBLICATIONS

International Preliminary Report on Patentability for PCT/US2018/058249, dated May 2020. (Year: 2020).*
Liskov, B et al, "Viewstamped replication revisited." (2012) <URL: https://dspace.mit.edu/bitstream/handle/1721.1/71763/MIT-CSAIL-TR-2012-021.pdf?sequence=1 > [public availabilty on Aug. 16, 2017.
Ongaro D. et al. 'In Search of an Understandable Consensus Algorithm (Extended Version)' (original: In Proc ATC'14, Usenix Annual Technical Conference (2014), USENIX.305-320.) <URL: http://pages.cs.wisc.edu/~remzi/Classes/739/Spring2004/Papers/raft.pdf >.
Van Renesse R et al. 'Vive la différence: Paxos vs. viewstamped replication vs. zab.' IEEE Transactions on Dependable and Secure Computing. Sep. 8, 2014;12(4):472-84.
Van Renesse R 'Paxos Made Moderately Complex' 2011 An online version is at <URL http://www.cs.cornell.edu/courses/CS7412/2011sp/paxos.pdf> since Apr. 2012 per Wayback Machine.
Veronese, G. et al. "Efficient byzantine fault-tolerance." IEEE Transactions on Computers 62.1 (2011): 16-30.
Correla M et al 'How to tolerate half less one Byzantine nodes in practical distributed systems.' Proceedings of the 23rd IEEE International Symposium on Reliable Distributed Systems, Oct. 18, 2004 (pp. 174-183). IEEE.

* cited by examiner

MANAGING A COMPUTING CLUSTER USING REPLICATED TASK RESULTS

CROSS-REFERENCE TO RELATED APPLICATIONS

This application claims priority to U.S. Application Ser. No. 62/579,225, filed on Oct. 31, 2017, incorporated herein by reference.

BACKGROUND

This description relates to managing a computing cluster.

One approach to data flow computation makes use of a graph-based representation in which computational components corresponding to nodes (vertices) of a graph are coupled by data flows corresponding to links (directed edges) of the graph (called a "dataflow graph"). A downstream component connected to an upstream component by a data flow link receives an ordered stream of input data elements and processes the input data elements in the received order, optionally generating one or more corresponding flows of output data elements. A system for executing such graph-based computations is described in prior U.S. Pat. No. 5,966,072, titled "EXECUTING COMPUTATIONS EXPRESSED AS GRAPHS," incorporated herein by reference. In an implementation related to the approach described in that prior patent, each component is implemented as a process that is hosted on one of typically multiple computer servers. Each computer server may have multiple such component processes active at any one time, and an operating system (e.g., Unix) scheduler shares resources (e.g., processor time, and/or processor cores) among the components hosted on that server. In such an implementation, data flows between components may be implemented using data communication services of the operating system and data network connecting the servers (e.g., named pipes, TCP/IP sessions, etc.). A subset of the components generally serve as sources and/or sinks of data from the overall computation, for example, to and/or from data files, database tables, and external data flows. After the component processes and data flows are established, for example, by a coordinating process, data then flows through the overall computation system implementing the computation expressed as a graph generally governed by availability of input data at each component and scheduling of computing resources for each of the components. Parallelism can therefore be achieved at least by enabling different components to be executed in parallel by different processes (hosted on the same or different server computers or processor cores), where different components executing in parallel on different paths through a dataflow graph is referred to herein as component parallelism, and different components executing in parallel on different portion of the same path through a dataflow graph is referred to herein as pipeline parallelism.

Other forms of parallelism are also supported by such an approach. For example, an input data set may be partitioned, for example, according to a partition of values of a field in records of the data set, with each part being sent to a separate copy of a component that processes records of the data set. Such separate copies (or "instances") of a component may be executed on separate server computers or separate processor cores of a server computer, thereby achieving what is referred to herein as data parallelism. The results of the separate components may be merged to again form a single data flow or data set. The number of computers or processor cores used to execute instances of the component would be designated by a developer at the time the dataflow graph is developed.

Various approaches may be used to improve efficiency of such an approach. For example, each instance of a component does not necessarily have to be hosted in its own operating system process, for example, using one operating system process to implement multiple components (e.g., components forming a connected subgraph of a larger graph).

At least some implementations of the approach described above suffer from limitations in relation to the efficiency of execution of the resulting processes on the underlying computer servers. For example, the limitations may be related to difficulty in reconfiguring a running instance of a graph to change a degree of data parallelism, to change to servers that host various components, and/or to balance load on different computation resources. Existing graph-based computation systems also suffer from slow startup times, often because too many processes are initiated unnecessarily, wasting large amounts of memory. Generally, processes start at the start-up of graph execution, and end when graph execution completes.

Other systems for distributing computation have been used in which an overall computation is divided into smaller parts, and the parts are distributed from one master computer server to various other (e.g., "slave") computer servers, which each independently perform a computation, and which return their result to a master server. Some of such approaches are referred to as "grid computing." However, such approaches generally rely on the independence of each computation, without providing a mechanism for passing data between the computation parts, or scheduling and/or sequencing execution of the parts, except via the master computer server that invokes those parts. Therefore, such approaches do not provide a direct and efficient solution to hosting computation involving interactions between multiple components.

Another approach for distributed computation on a large dataset makes use of a MapReduce framework, for example, as embodied in the Apache Hadoop® system. Generally, Hadoop has a distributed filesystem in which parts for each named file are distributed. A user specifies a computation in terms of two functions: a map function, which is executed on all the parts of the named inputs in a distributed manner, and a reduce function that is executed on parts of the output of the map function executions. The outputs of the map function executions are partitioned and stored in intermediate parts again in the distributed filesystem. The reduce function is then executed in a distributed manner to process the intermediate parts, yielding the result of the overall computation. Although computations that can be expressed in a MapReduce framework, and whose inputs and outputs are amendable for storage within the filesystem of the mapreduce framework can be executed efficiently, many computations do not match this framework and/or are not easily adapted to have all their inputs and outputs within the distributed filesystem.

In a general aspect, a method for processing tasks in a distributed data processing system including a number of processing nodes includes processing a number of sets of tasks using two or more of the number of processing nodes. Each set of tasks is configured to generate a corresponding set of results and being associated with a corresponding time interval of a number of time intervals. The method includes maintaining, at a first processing node of the number of processing nodes, a number of counters. The number of counters includes a working counter indicating a current time interval of the number of time intervals in the distributed data processing system, and a replication counter indicating a time interval of the number of time intervals for which at least one of (1) all tasks associated with that time interval, or (2) all corresponding results associated with that time interval, are replicated at multiple processing nodes of the number of processing nodes. The method includes providing messages from the first processing node to the other processing nodes of the number of processing nodes, the messages including the working counter and the replication counter.

Aspects may include one or more of the following features.

The processing may include performing computations associated with at least some tasks at a primary processing node of the number of processing nodes and performing computations associated with replicas of the at least some tasks at one or more backup processing nodes of the number of processing nodes. Performing computations associated with a first task at the primary processing node may include generating a first result at the primary processing node, and performing computations associated with a replica of the first task at the backup processing node includes generating the first result at the backup processing node.

The computations associated with the first task performed at the primary processing node and the computations associated with the replica of the first task performed at the backup processing node may both begin after a commit operation indicating that both the first task and the replica of the first task have been persistently stored. The first result may include a modified version of original data that has been replicated at the primary processing node and the backup processing node. The computations associated with the first task performed at the primary processing node may be identical to the computations associated with the replica of the first task performed at the backup processing node.

The computations associated with the first task performed at the primary processing node and the computations associated with the replica of the first task performed at the backup processing node may be deterministic and may not depend on which of the multiple processing nodes perform the computations. The replication counter may indicate a time interval of the number of time intervals for which all tasks associated with that time interval and all corresponding results associated with that time interval are replicated at multiple processing nodes of the number of processing nodes.

The processing may include performing computations associated with at least some tasks at a primary processing node of the number of processing nodes while a replica of the task remains dormant at a backup processing node, and sending a result corresponding to a task for which computations were performed from the primary processing node to the backup processing node. Performing computations associated with a first task at the primary processing node may include generating a first result, and the first result may be sent to from the primary processing node to the backup processing node after the first task has been completed at the primary processing node.

The first result may include a modified version of original data that has been replicated at the primary processing node and the backup processing node. The replication counter may indicate a time interval of the number of time intervals for which all tasks associated with that time interval and all corresponding results associated with that time interval are replicated at multiple processing nodes of the number of processing nodes.

In another general aspect, software for processing tasks in a distributed data processing system including a number of nodes is stored in a non-transitory form on a computer-readable medium. The software includes instructions for causing a computing system to process a number of sets of tasks using two or more of the number of processing nodes. Each set of tasks is configured to generate a corresponding set of results and being associated with a corresponding time interval of a number of time intervals.

The instructions also cause the computing system to maintain, at a first processing node of the number of processing nodes, a number of counters. The number of counters include a working counter indicating a current time interval of the number of time intervals in the distributed data processing system, and a replication counter indicating a time interval of the number of time intervals for which at least one of (1) all tasks associated with that time interval, or (2) all corresponding results associated with that time interval, are replicated at multiple processing nodes of the number of processing nodes. The instructions also cause the computing system to provide messages from the first processing node to the other processing nodes of the number of processing nodes, the messages including the working counter and the replication counter.

In another general aspect, an apparatus for processing data includes a distributed data processing system including a number of processing nodes, each processing node including at least one processor and a communication medium connecting the number of processing nodes for sending and receiving information between processing nodes of the number of processing nodes. The distributed data processing system is configured to process a number of sets of tasks using two or more of the number of processing nodes, each set of tasks configured to generate a corresponding set of results and being associated with a corresponding time interval of a number of time intervals, maintain, at a first processing node of the number of processing nodes, a number of counters. The number of counters include a working counter indicating a current time interval of the number of time intervals in the distributed data processing system, and a replication counter indicating a time interval of the number of time intervals for which at least one of (1) all tasks associated with that time interval, or (2) all corresponding results associated with that time interval, are replicated at multiple processing nodes of the number of processing nodes. The apparatus is further configured to provide messages from the first processing node to the other processing nodes of the number of processing nodes, the messages including the working counter and the replication counter.

In another general aspect, a computing system for processing tasks in a distributed data processing system including a number of processing nodes includes means for processing a number of sets of tasks using two or more of the number of processing nodes, each set of tasks configured to generate a corresponding set of results and being associated with a corresponding time interval of a number of time intervals, means for maintaining, at a first processing node of the number of processing nodes, a number of counters. The number of counters includes a working counter indicating a current time interval of the number of time intervals in the distributed data processing system and a replication counter indicating a time interval of the number of time intervals for which at least one of (1) all tasks associated with that time interval, or (2) all corresponding results associated with that time interval, are replicated at multiple processing nodes of the number of processing nodes. The computing system also includes means for providing messages from the first processing node to the other processing nodes of the number of processing nodes, the messages including the working counter and the replication counter.

Aspects can have one or more of the following advantages.

In general, some features described herein enable an increase computational efficiency (e.g., a distributed data processing system that includes a number of processing nodes is able to increase a number of records processed per unit of given computing resources) of a computation, especially a computation whose underlying specification is in terms of a graph-based program specification, as compared to approaches described above, in which components (or parallel executing copies of components) are hosted on different servers. For example, a call cluster component is disposed in a graph-based program specification and is used to interface the graph-based program specification with the distributed data processing system such that computations required by the graph-based program specification are performed in a distributed manner by the processing nodes in the graph-based program specification. Furthermore, some features described herein provide the ability to adapt to varying computation resources and computation requirements. A computation approach is provided herein that permits adapting to variation in the computing resources that are available during execution of one or more graph-based computations, and/or to variations in the computation load or time variation of load of different components of such computations, for example, due to characteristics of the data being processed. For example, aspects are able to adapt to processing nodes being added or removed (or failing and coming back online) from the distributed data processing system. One way that the distributed data processing system provides the adaptation is by managing replication and persistence of data in the system including maintaining counts of messages sent and received by processing nodes and maintaining indicators of time intervals where all messages are replicated and/or made persistent in the system.

A computation approach is also provided that is able to efficiently make use of computational resources with different characteristics, for example, using servers that have different numbers of processors per server, different numbers of processor cores per processor, etc., and to support both homogeneous as well as heterogeneous environments efficiently. Some features described herein are also able to make the start-up of graph-based computations quick. One aspect of providing such efficiency and adaptability is providing for appropriate management of a cluster of processing nodes, as described herein.

Aspects also are advantageously fault tolerant in that the distributed data processing system is able to recover from any processing errors that occur by rolling the processing back in time. The system anticipates a number of possible rollback scenarios and implements algorithms for performing the rollback in each of the possible rollback scenarios.

DESCRIPTION

Figure 1:
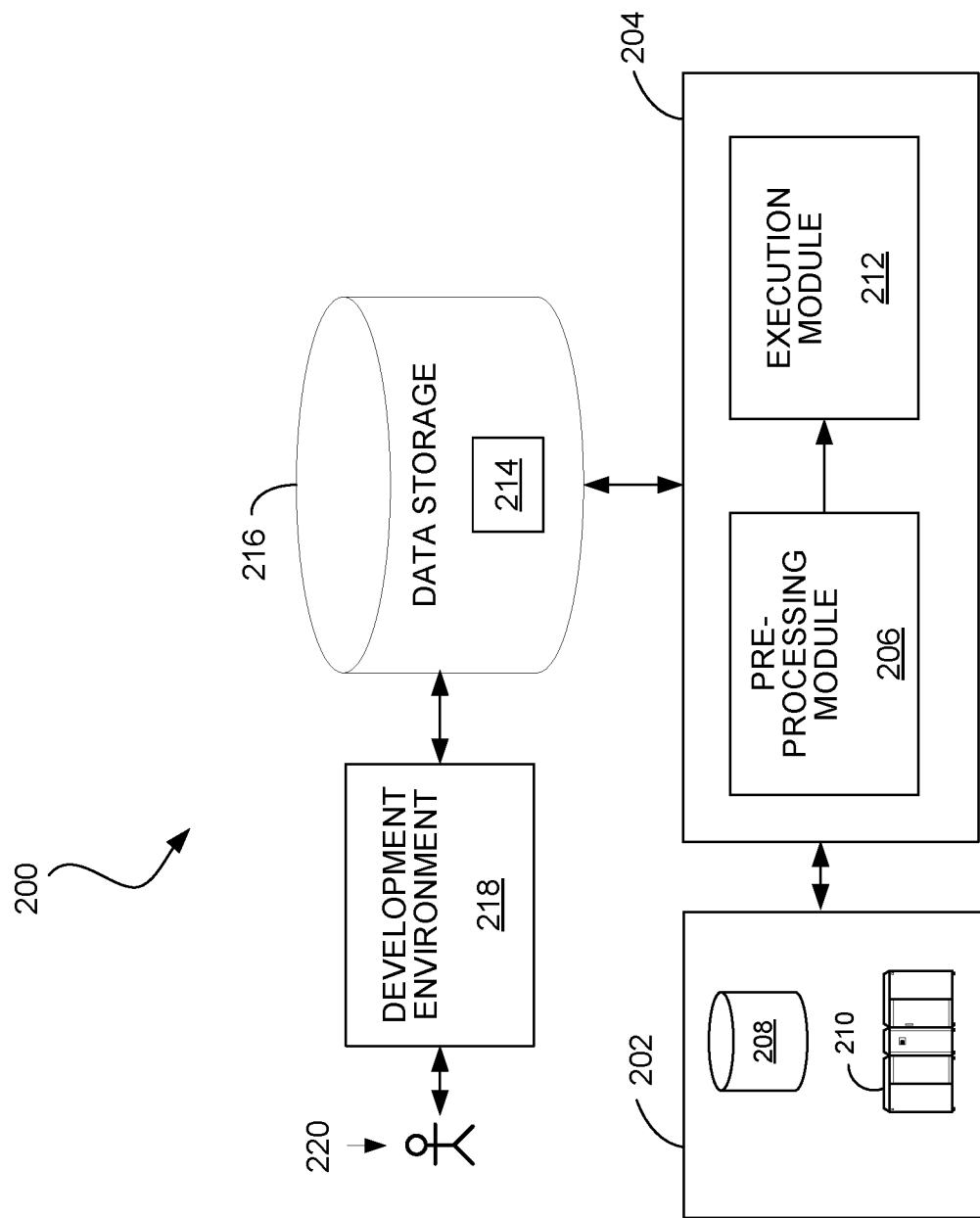
FIG. 1 is a block diagram of a system for processing data.

FIG. 1 shows an example of a data processing system 200 in which the computing cluster management techniques can be used. The system 200 includes a data source 202 that may include one or more sources of data such as storage devices or connections to online data streams, each of which may store or provide data in any of a variety of formats (e.g., database tables, spreadsheet files, flat text files, or a native format used by a mainframe). An execution environment 204 includes a pre-processing module 206 and an execution module 212. The execution environment 204 may be hosted, for example, on one or more general-purpose computers under the control of a suitable operating system, such as a version of the UNIX operating system. For example, the execution environment 204 can include a multiple-node parallel computing environment including a configuration of computer systems using multiple processing units (e.g., central processing units, CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The pre-processing module 206 is able to perform any configuration that may be needed before a program specification (e.g., the graph-based program specification described below) is executed by the execution module 212. The pre-processing module 206 can configure the program specification to receive data from a variety of types of systems that may embody the data source 202, including different forms of database systems. The data may be organized as records having values for respective fields (also called "attributes", "rows" or "columns"), including possibly null values. When first configuring a computer program, such as a data processing application, for reading data from a data source, the pre-processing module 206 typically starts with some initial format information about records in that data source. The computer program may be expressed in form of the dataflow graph as described herein. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Storage devices providing the data source 202 may be local to the execution environment 204, for example, being stored on a storage medium connected to a computer hosting the execution environment 204 (e.g., hard drive 208), or may be remote to the execution environment 204, for example, being hosted on a remote system (e.g., mainframe 210) in communication with a computer hosting the execution environment 204, over a remote connection (e.g., provided by a cloud computing infrastructure).

The execution module 212 executes the program specification configured and/or generated by the pre-processing module 206 to read input data and/or generate output data. The output data 214 may be stored back in the data source 202 or in a data storage system 216 accessible to the execution environment 204, or otherwise used. The data storage system 216 is also accessible to a development environment 218 in which a developer 220 is able to develop applications for processing data using the execution module 212.

In other words, the data processing system 200 may include:

the optional development environment 218 coupled to a data storage 216, wherein the development environment 218 is configured to build a data processing application that is associated with a data flow graph that implements a graph-based computation performed on data flowing from one or more input data sets through a graph of processing graph components to one or more output data sets, wherein the data flow graph is specified by data structures in the data storage 216, the dataflow graph having a number of nodes being specified by the data structures and representing the graph components connected by one or more links, the links being specified by the data structures and representing data flows between the graph components;

the execution environment 212 coupled to the data storage 216 and being hosted on one or more computers, the execution environment 212 including a pre-processing module 206 configured to read the stored data structures specifying the data flow graph and to allocate and configure computing resources, such as processes, for performing the computation of the graph components that are assigned to the data flow graph by the pre-processing module 206;

wherein the execution environment 204 including the execution module 212 to schedule and control execution of the assigned computation or processes such that the graph-based computations are executed. That is, the execution module is configured to read data from the data source 202 and to process the data using an executable computer program expressed in form of the dataflow graph.

1 Computing Cluster

Very generally, some computer programs (also called "applications" herein) for processing data using the execution module 212 include a call cluster component that the application uses to access a computing cluster. For examples, referring to FIG. 2, in an approach to pipelined data processing, a call cluster component 110 interacts with components of a computer cluster 120 to process records 103 received at the call cluster component 110 from components in an application (e.g., a dataflow graph or other form of graph-based program specification) that it is part of and transmit corresponding results 105 to one or more other components of the application it is part of. For each input record 103, the call cluster component 110 sends a request 113 (e.g., a request to execute a data processing task) to the cluster 120, and some time later it receives a response 115 to that request 113 from the cluster 120. Some time after the receipt of the response 115, the call cluster component 110, generally after the result of processing the request is known to be suitably persistent in the cluster 120, the call cluster component 110 sends a result 105 corresponding to the response 115.

Figure 2:
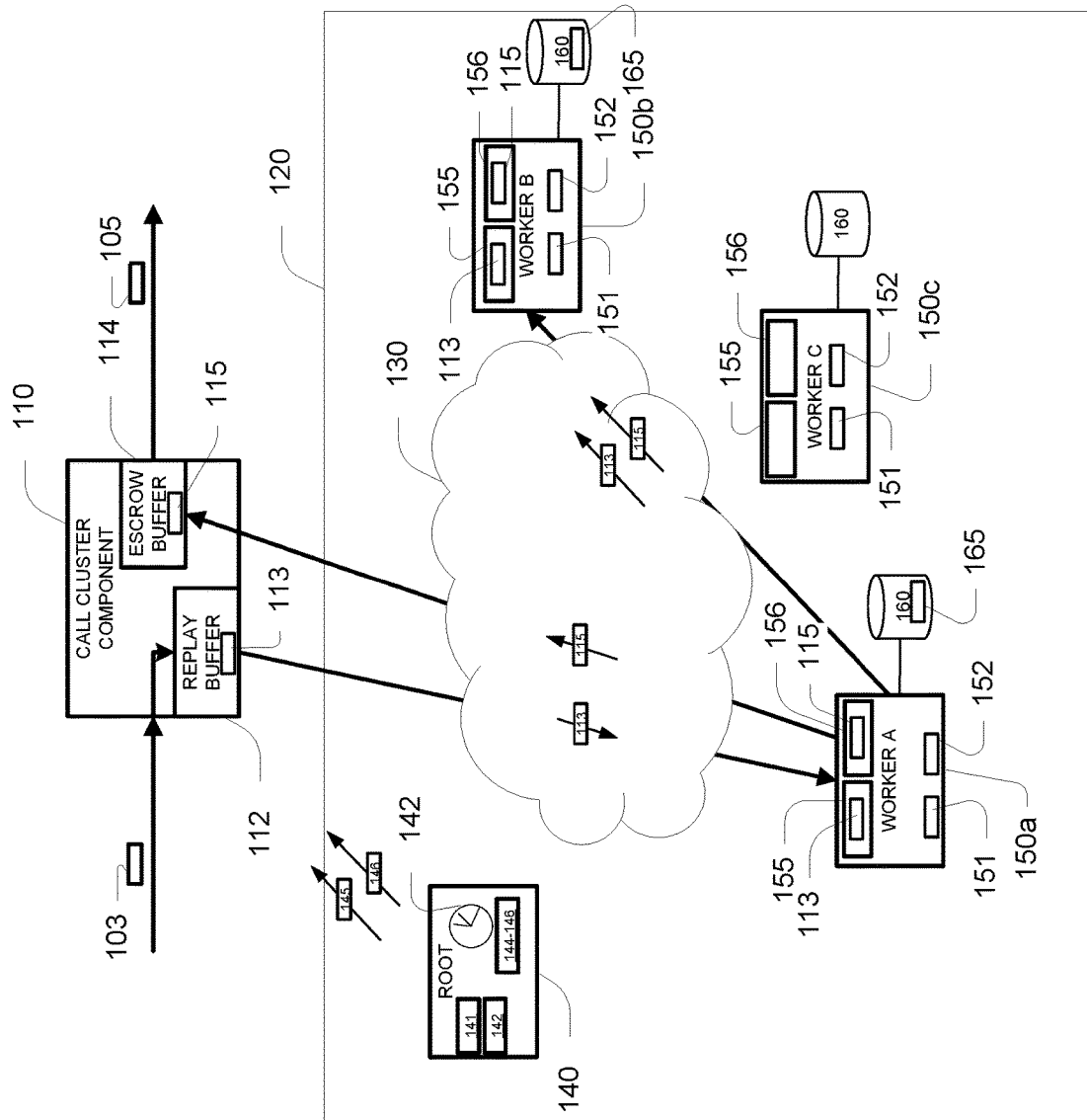
FIG. 2 is a block diagram of a computation system including a computing cluster.

The graph-based program specification that the call cluster component 110 is part of is not shown in FIG. 2. In FIG. 2, only a single call cluster component 110 is shown, but it should be recognized that there may in general be many call cluster components that may interact with the same cluster 120, for example, each call cluster component participating in the same or a different application such as a dataflow graph. The graph-based program specification may be implemented, for example, as a dataflow graph as described in U.S. Pat. Nos. 5,966,072, 7,167,850, or U.S. Pat. No. 7,716,630, or a data processing graph as described in U.S. Publication No. 2016/0062776. Such dataflow graph based program specifications generally include computational components corresponding to nodes (vertices) of a graph coupled by data flows corresponding to links (directed edges) of the graph (called a "dataflow graph"). A downstream component connected to an upstream component by a data flow link receives an ordered stream of input data elements and processes the input data elements in the received order, optionally generating one or more corresponding flows of output data elements. In some examples, each component is implemented as a process that is hosted on one of typically multiple computer servers. Each computer server may have multiple such component processes active at any one time, and an operating system (e.g., Unix) scheduler shares resources (e.g., processor time, and/or processor cores) among the components hosted on that server. In such an implementation, data flows between components may be implemented using data communication services of the operating system and data network connecting the servers (e.g., named pipes, TCP/IP sessions, etc.). A subset of the components generally serve as sources and/or sinks of data from the overall computation, for example, to and/or from data files, database tables, and external data flows. After the component processes and data flows are established, for example, by a coordinating process, data then flows through the overall computation system implementing the computation expressed as a graph generally governed by availability of input data at each component and scheduling of computing resources for each of the components.

The cluster 120 includes multiple cluster components 140, 150a-c coupled by a communication network 130 (illustrated in FIG. 2 as a "cloud," and can have various interconnection topologies, such as start, shared medium, hypercube, etc.). Each cluster component (or simply "component") has a particular role in the cluster. In some implementations, each of the components is hosted on a distinct computing resource (e.g., a separate computer server, a separate core of a multi-core server, etc.). It should be understood that these components represent roles within the cluster, and that in some embodiments, the multiple roles may be hosted on one computing resource, and a single role may be distributed over multiple computing resources.

In FIG. 2, a root component 140 (referred to as the "root") performs certain synchronization functions described fully below but is not directly involved in the flow of or computation on data to be processed. A number of worker components 150a-c (referred to as "workers" below) process requests 113 from the call cluster component 110. Data 165 is stored in a redundant manner in storages 160 accessible to respective workers 150, and each request 113 may need to access (for reading and/or writing) a particular part of the data, stored in the storages 160, identified by a key in the request 113, which is distributed among a particular subset of the workers that is determined by the key. Of those workers that hold the data for the key needed for the particular request, one worker is designated as the primary worker (e.g. worker 150a) where the request 113 is executed, and the other workers are designated backups in that they do not generally or necessarily execute the request, but their version of the data is updated in accordance with or in the same manner as at the primary worker.

In FIG. 2, a path of a particular input record 103, which may be considered to be or include a data unit to be processed, is illustrated as it enters the call cluster component 110, then the corresponding request 113 (with the data unit) is sent by component 110 to the primary worker 150a (worker A) for the request, with the response 115 from the primary worker 150a sent back to the call cluster component 110 as well as to the backup worker 150b (worker B) for the request, and finally the corresponding result 105 is outputted or sent from the call cluster component 110. In general, there may be multiple backup components for each request; however, for ease of explanation, only a single backup component is illustrated in many examples below.

As is discussed further below, the call cluster component 110 buffers requests 113 in a replay buffer 112, and if necessary may resend requests to the cluster 120 to ensure that they have been properly received and/or processed by the cluster 120. The component 110 also buffers responses 115 in an escrow buffer 114 and may receive redundant copies of certain responses in the event of an error condition being detected. In general, the component 110 holds responses "in escrow" until the cluster 120 informs the component 110 that the response 115 is suitably persistent (i.e., stored at a data store with a suitable durability level) in the cluster.

Figure 3:
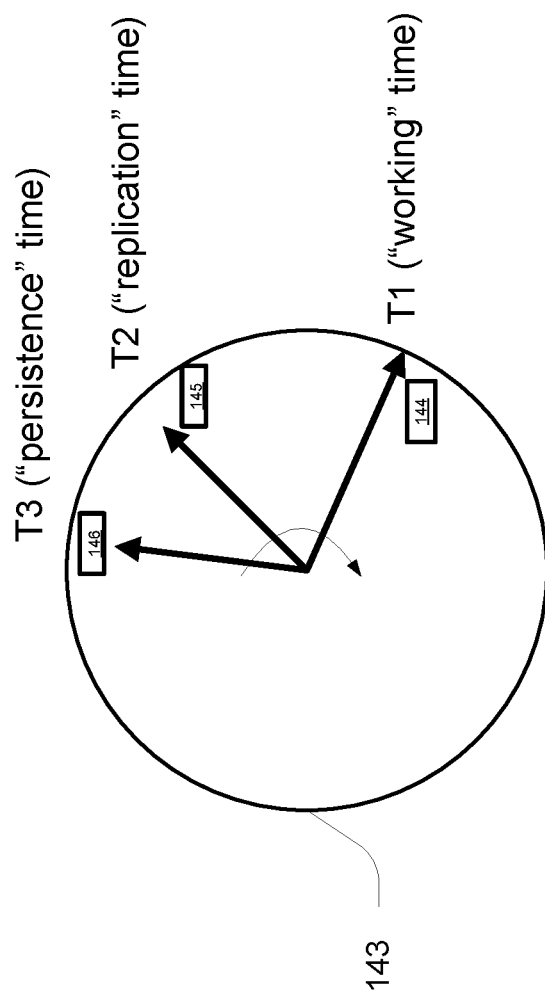
FIG. 3 is schematic diagram of a clock representing times for various repeating time intervals.

The root 140 performs a synchronization function by maintaining and distributing time (interval) values to the other components and distributing certain of the time values to the call cluster component 110. Referring to FIG. 3, the clock 142 of the root 140 maintains three times. Time T1 is a current working time or time interval, for example represented as an integer value, and is updated repeatedly, for example, being incremented by once every second.

When requests 113 that are received by the cluster 120 from the call cluster component 110, and responses 115 are generated (or transmitted) by the cluster, they are each associated with a working (T1) time when they were received and generated (or transmitted), respectively (or equivalently with time intervals during which the time T1 has the same value, i.e., between increments of T1). The root maintains and distributes a second time, T2, which lags time T1. Time T2 represents a time (interval) such that all requests and/or responses created at that time or earlier that were sent between components 150a-c of the cluster 120 have been replicated (e.g., in volatile memory) at multiple of the components 150a-c such that they would not have to be resent in the case of a rollback of operations to handle an error, as described in substantially more detail below. In some examples, replication (e.g., in volatile memory) is referred to as being stored in a data store with a first level of durability. The root maintains and distributes a third time (interval) T3, which lags time T1 and T2, that represents a time such that all requests and/or responses created at that time or earlier have been stored and made permanent in persistent memory at least one, or even all, of the workers 150a-c where that data 165 is stored such that they would not have to be resent or recomputed in the case of a rollback of operations to handle a failure of a component in the cluster 120. In some examples, being stored in persistent memory (e.g., to disk) is referred to as being stored in a data store with a second level of durability that is relatively more durable than the first level of durability. It is noted that data stores can be associated with a number of different levels of durability that are relatively more durable or less durable than the data stores with the first level or durability and the data stores with the second level of durability. For example, an offsite data store that is outside of the cluster may have a third level of durability that is relatively more durable than the first and second levels of durability. In some examples, the time intervals T1, T2, and T3 are alternatively referred to as "state consistency indicators."

A mechanism for the root 140 to determine when to increment the replication (T2) time or the persistence (T3) time is described later in this description, as are mechanism for distributing the values of the times (T1-T3) to the workers 150a-c.

Figure 4:
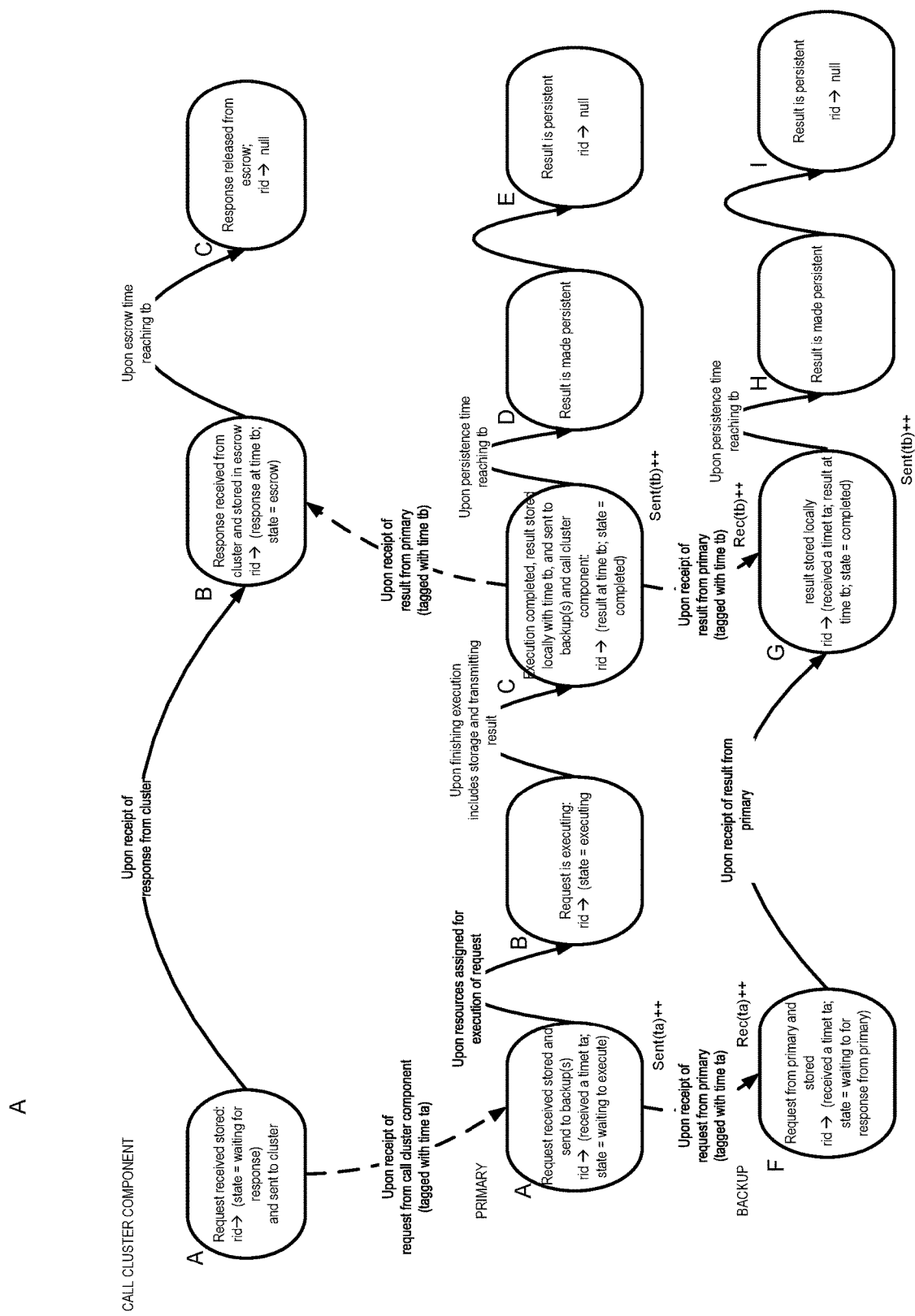
FIG. 4 is a state transition diagram for operating procedures.

In normal operation, a request 113 received by the cluster 120 is processed at a worker 150 identified as the primary worker based on the key of the data unit of the request, and in general at one or more backup workers 150, also identified based on the key of the data required. Referring to FIG. 4, this processing can be represented as transitions between different states for that request at the call cluster component 110 and the primary and backup workers 150. Note that different requests are in different states and are in general processed at different workers depending on the referenced data, and therefore the call cluster component and any particular worker may have many requests at different states.

In general, each key is associated with a corresponding subset of workers 150, for instance selected in a pseudo-random manner based on the key (e.g., a deterministic function of the key, which distributes the backups unpredictably for each key value). More generally, and preferably, these subsets overlap with other of the subsets rather than forming a partition of the complete set of workers according to the key values.

When a request 113, which has (or is assigned by the call cluster component) a unique identifier, rid, is formed at the call cluster component 110 for each input record 103, the request enters a state A in the call cluster component. In the description below, each request 113 is in one of three states, labelled A-C, of the call cluster component, and in one of nine different stats, labelled A-I, at each of the workers 150 processing the request. After the call cluster component 110 records the request 113, it determines the worker 150 that is assigned to be the primary worker for the request, and sends the request 113 to that worker 150, shown as worker A in FIG. 2. Note that in alternative embodiments, the call cluster component 110 may not be aware of which worker is the designated primary, and the request 113 may be routed internally in the cluster 120 to reach the designated primary worker 150a. The request 113 remains in state A at the call cluster component 110 until a response 115 for the request is received back from the cluster 120.

When a request 113, which has (or is assigned by the call cluster component) a unique identifier, rid, is formed at the call cluster component 110 for each input record 103, the request enters a state A in the call cluster component. In the description below, each request 113 is in one of three states, labelled A-C, of the call cluster component, and in one of nine different stats, labelled A-I, at each of the workers 150 processing the request. After the call cluster component 110 records the request 113, it determines the worker 150 that is assigned to be the primary worker for the request, and sends the request 113 to that worker 150, shown as worker A in FIG. 2. Note that in alternative embodiments, the call cluster component 110 may not be aware of which worker is the designated primary, and the request 113 may be routed internally in the cluster 120 to reach the designated primary worker 150a. The request 113 remains in state A at the call cluster component 110 until a response 115 for the request is received back from the cluster 120.

At the call cluster component 110, when the response 115 is received from the primary worker, the request enters state B in which the response is stored in association with the time tb it was produced by the primary worker. The response 115 is retained at the call cluster component in the escrow buffer 114 until it receives an escrow time from the root 140 that is equal or greater than tb. Depending on the persistence requirements of the requests from that call cluster component, the root may provide either the replication time T2, or the persistence time T3, as the escrow time for the call cluster component. When the call cluster component 110 receives an escrow time that is equal or greater than tb, it sends the result 105 out from the call cluster component and the corresponding request 113 enters a null state C in which no further record of the request 113 or its response 115 is required (e.g., it may be deleted completely).

At the backup worker(s) 150, when the backup worker receives the request 113 from the primary worker, the backup worker enters a state F in which the request is associated with the original request time to (even if the current working time T1 has incremented beyond it), and the request is in a state waiting for the response from the primary worker. When the backup worker 150b receives the response 115 from the primary worker, and the response 115 is therefore replicated in that backup's volatile memory 156, it enters state G.

As soon as a primary or backup worker has a newly generated response 115, it is free to begin the process of saving that response to persistent storage 160 (see states D and H), such as a disk-based or non-volatile-memory based database or file system. A journal-based approach may be used in which updates to the persistent memory are journaled, first in a volatile-memory-based journal, with parts of that journal being written to persistent storage 160 from time to time. Note that even when a part of the journal of updates is written to the persistent storage 160, those updates are not made permanent (i.e., "committed") until an explicit indicator regarding the extent of the update that are to be considered permanent is written to the persistent storage.

At a time that the root 140 has determined that all requests and responses associated with time tb and earlier have been replicated at all the appropriate workers, T2 reaches or increments to tb. After the time T2=tb is distributed from the root 140 to the primary and backup workers 150, these workers make the responses permanent in persistent storage 160. If the journal of updates through that time tb have not yet been written to the persistent memory, they are written at that time. More generally, the journal through time tb has been written by a worker to the persistent storage 160 by the time T2 reaches or increments to tb, and all that must be done at this time is to complete the task of making the updates permanent by recording an indicator that updates through time tb in the persistent journal are to be treated as permanent. During the potentially short time that the primary worker is making the journal permanent, it is in state D. When the primary worker has made the response for the request illustrated in FIG. 4 in persistent storage it enters state E. Similarly, while the backup is making the response permanent it is in state H and when the backup has made the response permanent in persistent memory, it enters state I. When the root determines that all the responses associated with time tb (and earlier) are permanent in persistent memory (i.e., are all in states E or I), it increments the persistence time T3 to tb. As introduced above, for situations in which the escrow time is for requests at the call cluster component is the persistence time, T3, the root 140 informs the call cluster component 110 that the escrow time has become equal to or greater than tb, and the call cluster component 110 releases the corresponding result 105 for that request 113 and response 115 to one or more other components within the application (e.g. graph).

As introduced above, in normal operation, the root updates the working time T1 as successive requests 113 from the call cluster component are processed in the cluster, responses 115 are returned to the call cluster component, and released from the call cluster component to the graphs according to updates of the escrow time T2 or T3. In general, processing of a particular request 113 may take many time "ticks" of the working time T1, for example, 10's or 100's of ticks, and therefore the cluster may have many requests that are in progress, with many different request times associated with them. Furthermore, because the data is distributed among the workers, load is effectively distributed among the workers according to the keys of those requests such that each worker may have multiple requests for which the worker is acting as a primary worker (i.e., in one of states A-E) and also have multiple requests for which it is acting as a backup worker (i.e., in one of states F-I).

It is noted that some requests to the cluster for performing a task use a procedure, as described herein, for replicating the task and replicating corresponding results of performing that task. For example, after a task has been tagged and replicated (but not necessarily made persistent) at a backup worker, the task is initialized at a primary worker. If the task operates on a data record, the initialization may involve preserving an original version 1 of the record. The task then executes on the primary worker, but remains dormant on the backup worker. After the processing has completed, there is a modified version 2 of the record. A finalization of the task may then include sending the modified version 2 of the record from the primary worker to the backup worker. Then both the primary worker and the backup worker are able to delete the original version 1 of the record (along with the replicated task). Each of these steps is reasonably efficient, but if the task is very short in duration, the overhead associated with these initialization and finalization procedures may make the tasks less efficient.

Alternatively, a different procedure can be used for some tasks that are relatively short in duration (a "short task"). The short task is still tagged and replicated at a backup worker. But, the initialization does not need preserve an original version 1 of the record. Instead, after a commit operation indicates that both the short task and a replica of the short task have been persistently stored at the primary and backup workers, respectively, the short task is executed at both workers. At the end of that execution there will be copies of the modified version 2 of the record at both the primary and backup workers, without any communication needed to transmit the modified record. There is redundant processing at both workers, but this redundancy does not greatly impact efficiency since the task is short. This alternative procedure is useful if, for example, the short task is deterministic and produces the same results no matter which worker is executing it.

2 Example of Normal Operation

Figure 5:
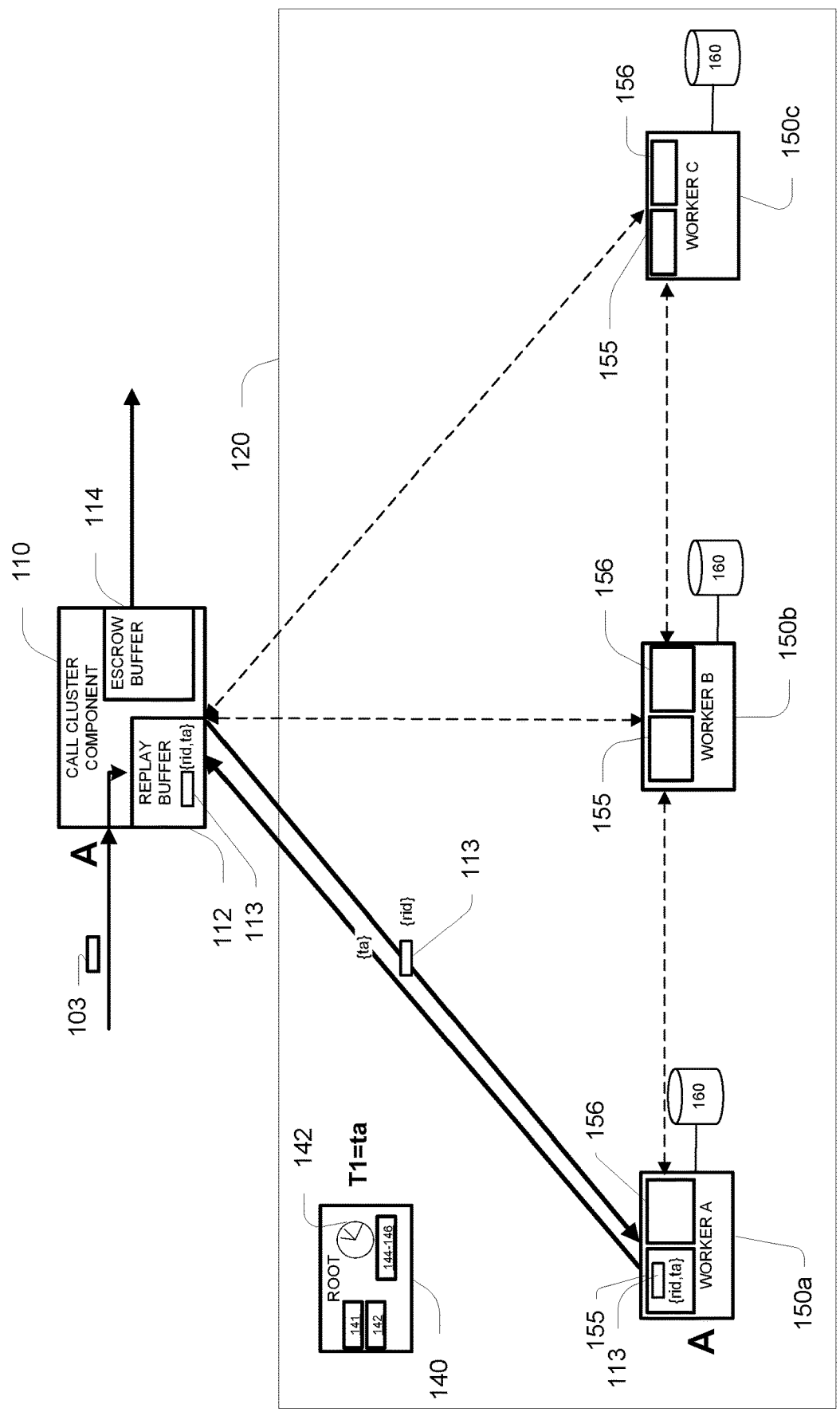
FIGS. 5 to 12 illustrate normal operation of the computation system.

Referring to FIGS. 5-12, one example of normal operation of the call cluster component 110 and the cluster 120 is illustrated. In FIG. 5, an input record 103 arrives at the call cluster component 110 and the call cluster component 110 forms a request 113 for the input record 103. The call cluster component 110 associates the request 113 with a unique request identifier, rid and stores it in the replay buffer 112 of the call cluster component 110.

The call cluster component 110 transmits the request 113 to the cluster 120, and it is received at the primary worker 150a (worker A) in the cluster 120 at time T1=ta. The request 113 is stored in the volatile memory 155 of the primary worker 150a and is assigned a request time equal to the current working time (T1=ta). The request time for the request 113 is provided to the call cluster component 110 which associates the request time (i.e., ta) with the request 113 stored in the replay buffer 112. The request 113 stored in the replay buffer 112 of the call cluster component 110 is in state A (see FIG. 4), waiting for a response from the cluster 120. The request 113 stored in the volatile memory 155 of the primary worker is in state A, waiting for computing resources to be assigned for execution of the request 113.

Figure 6:
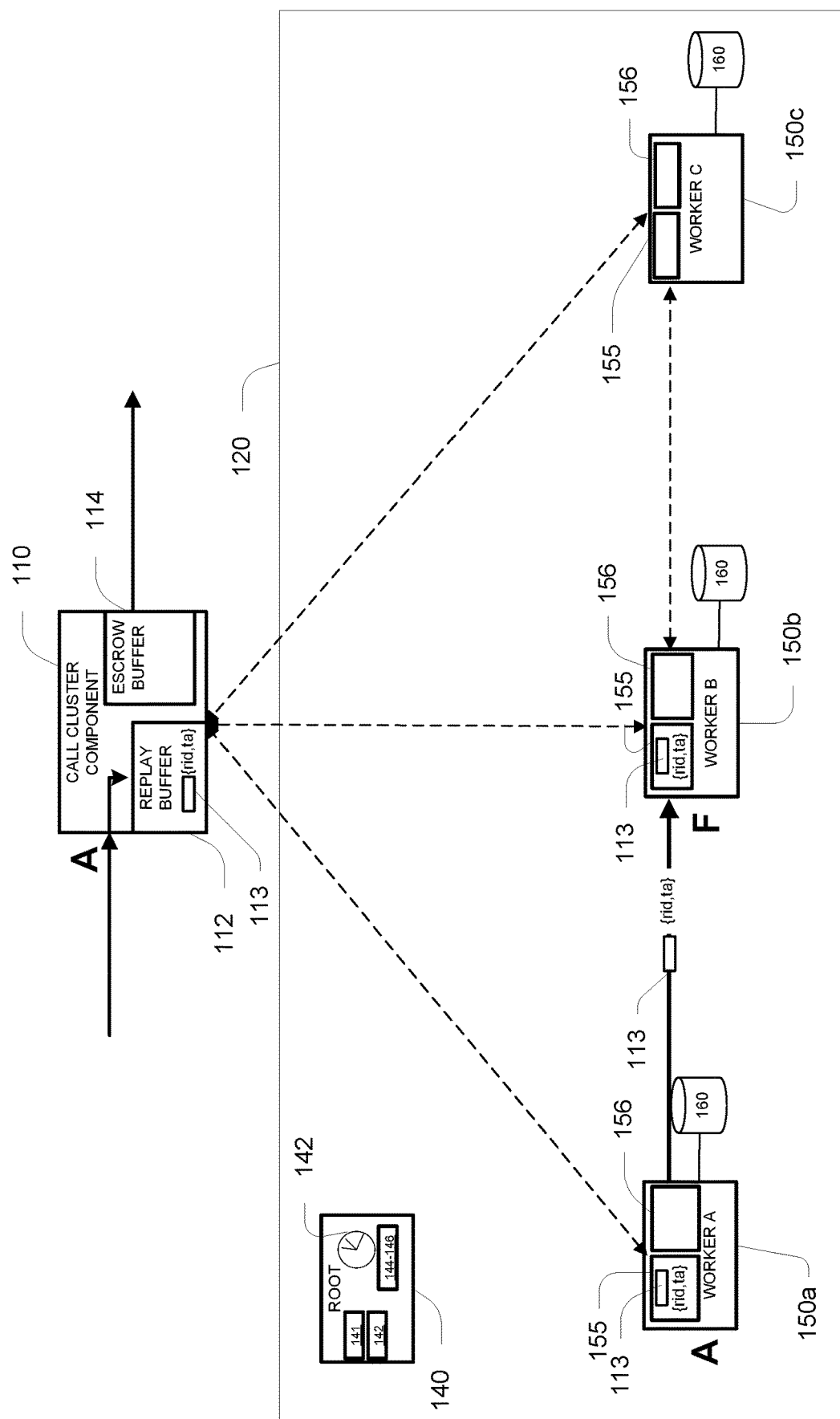

Referring to FIG. 6, the primary worker sends the request 113 to a backup worker 150b (worker B), where it is stored in the volatile memory 155 of the backup worker 150b. The request 113 stored in the volatile memory 155 of the backup worker 150b is in state F waiting to receive a response from the primary worker.

Figure 7:
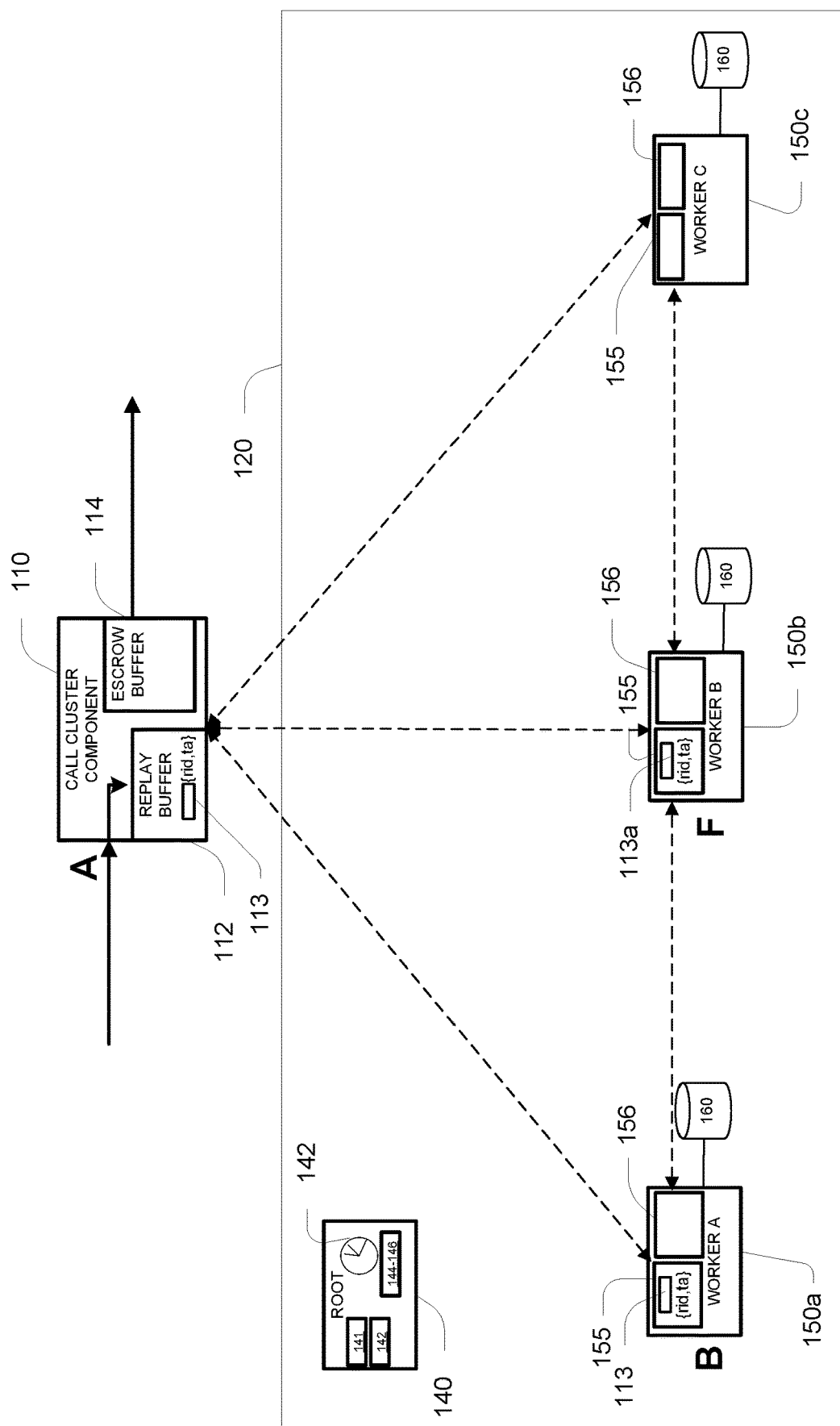

Referring to FIG. 7, once the primary worker 105 assigns computing resources (e.g. of the primary worker or of another part of the cluster) to the request 113, the request 113 enters state B at the primary worker 105 and begins execution.

Figure 8:
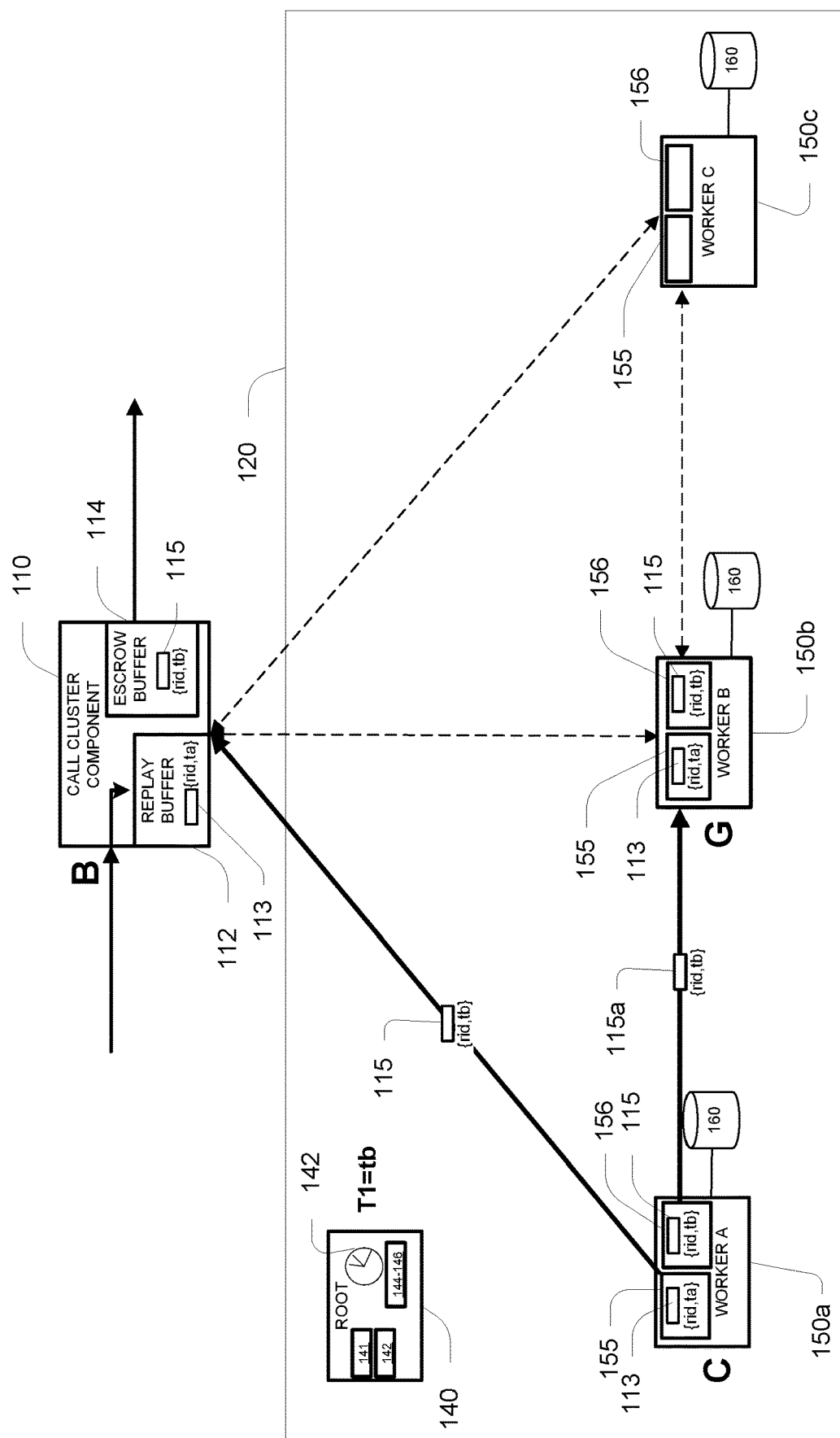

Referring to FIG. 8, at time T1=tb the primary worker 105 completes execution of the request 113. Execution of the request 113 generates a response 115 which is stored in the volatile memory 156 of the primary worker. The response 115 is associated with the request identifier (rid) of the request 113 and with the time it was generated (tb). The primary worker sends the response 115 to the call cluster component 110 and to the backup worker 150b and the request 113 is then in state C, waiting for the waiting for the persistence time, T3, to reach tb.

The call cluster component 110 receives the response 115 and stores it in its escrow buffer 114. With the response stored in the escrow buffer 114, the result 115 is in state B at the call cluster component 110, waiting for the persistence time, T3 (the escrow time in this example), to reach tb. The backup worker 150b receives the response 115 and stores it in its volatile memory 156. The request 113 at the backup worker 150b enters state G, waiting for the persistence time, T3, to reach tb.

Though not shown in FIG. 8, with the response 115 stored (replicated) in the volatile memories 156 of the primary worker 150a and the backup worker 150b, the replication time, T2 is set to tb.

Figure 9:
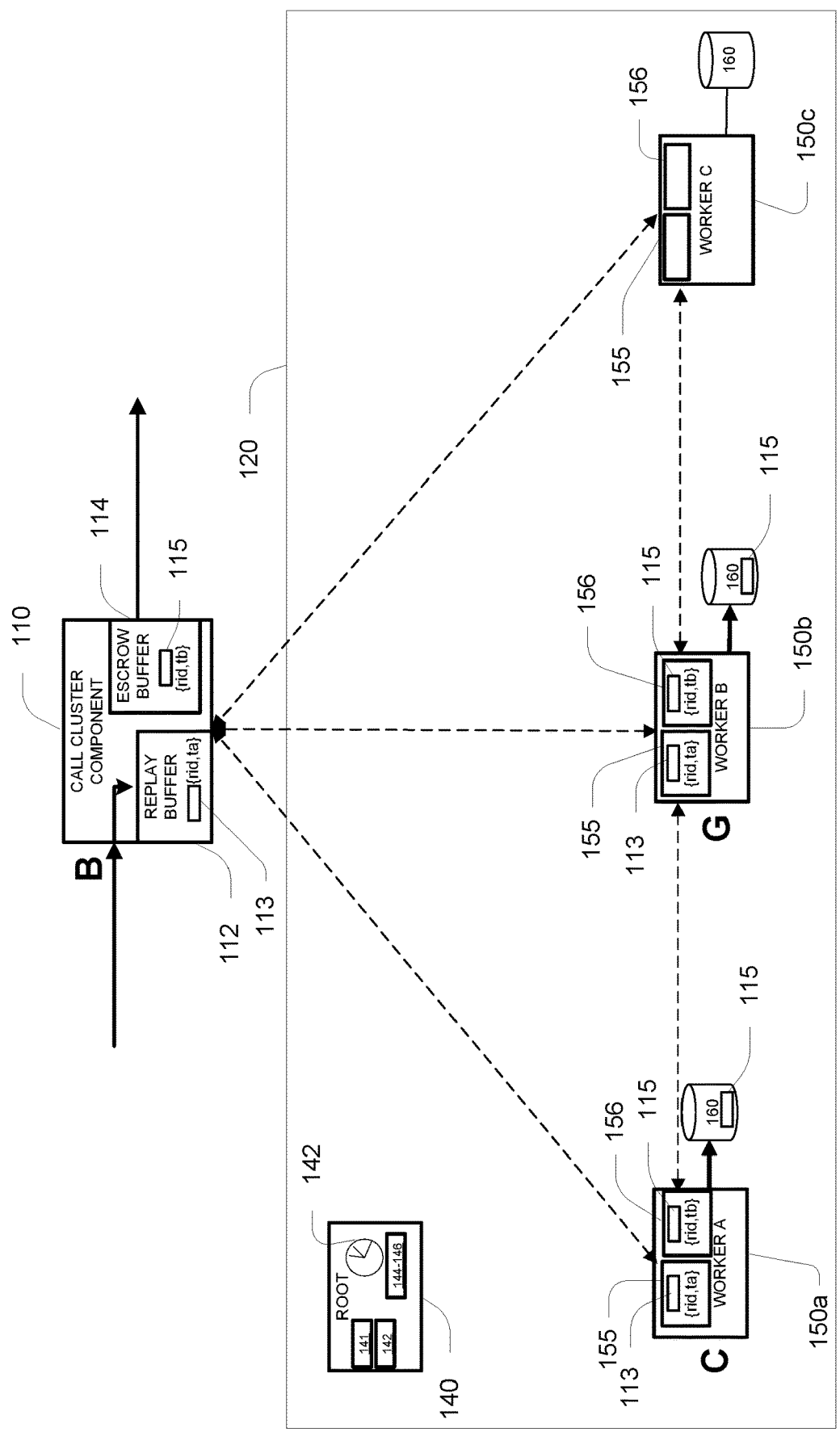

Referring to FIG. 9, once the response 115 stored in the volatile memory 156 of one or both of the primary worker 150a and the backup worker 150b, the primary worker 150a and the backup worker 150b begin storing the response 115 to respective persistent storage 160, while also remaining stored in the respective volatile memories 155, 156.

Figure 10:
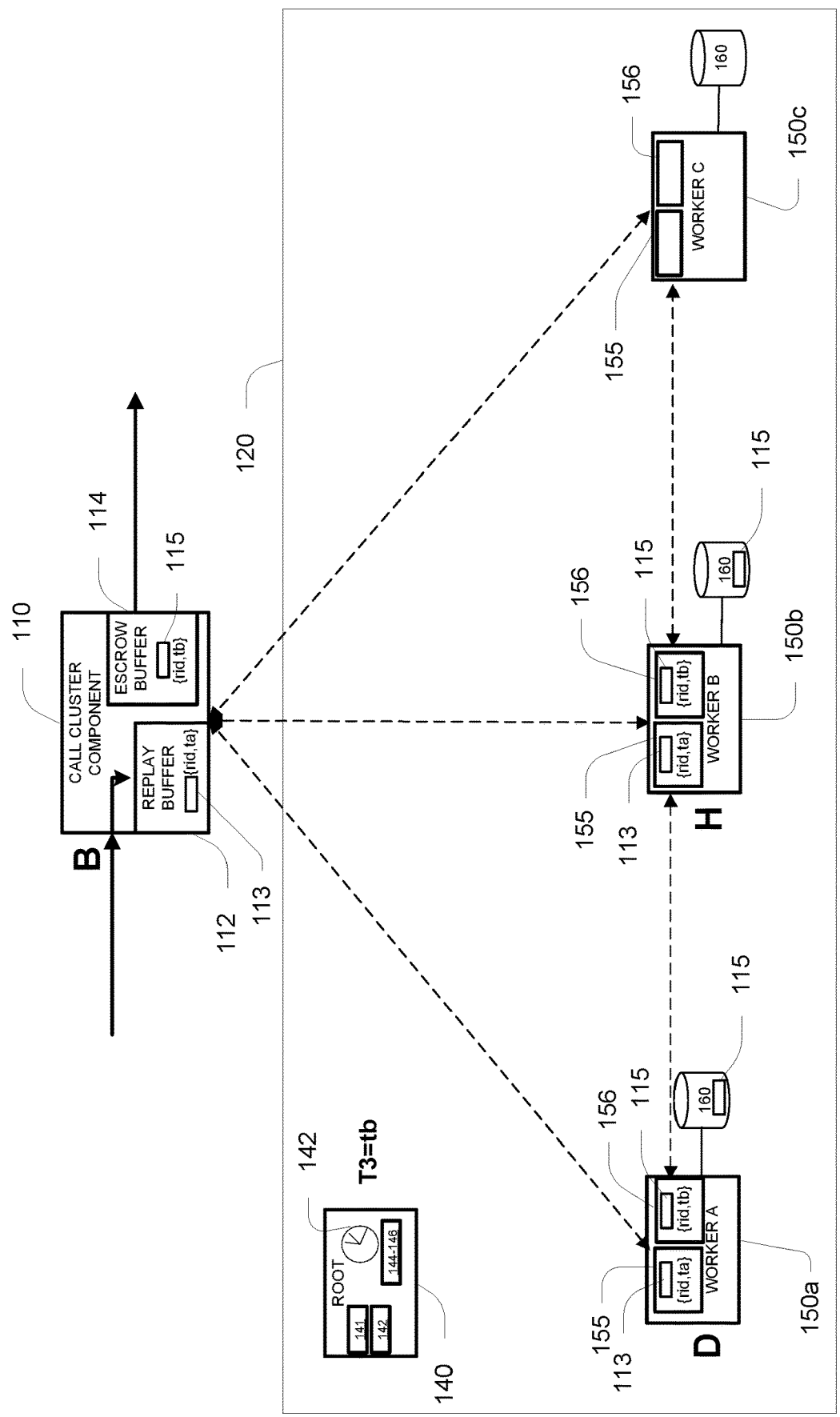

Referring to FIG. 10, after the response 115 is stored at the primary worker and is replicated at the backup worker 150b, the persistence time, T3, is set to tb. The primary worker 150a and the backup worker 150b finalize permanent storage of the response 115 in the persistent storage 160. The request 113 stored at the primary worker is in state D and the request 113 stored at the backup worker 150b is in state H at which the request 113 and the response 115 are still stored in volatile memories 155, 156, respectively.

Figure 11:
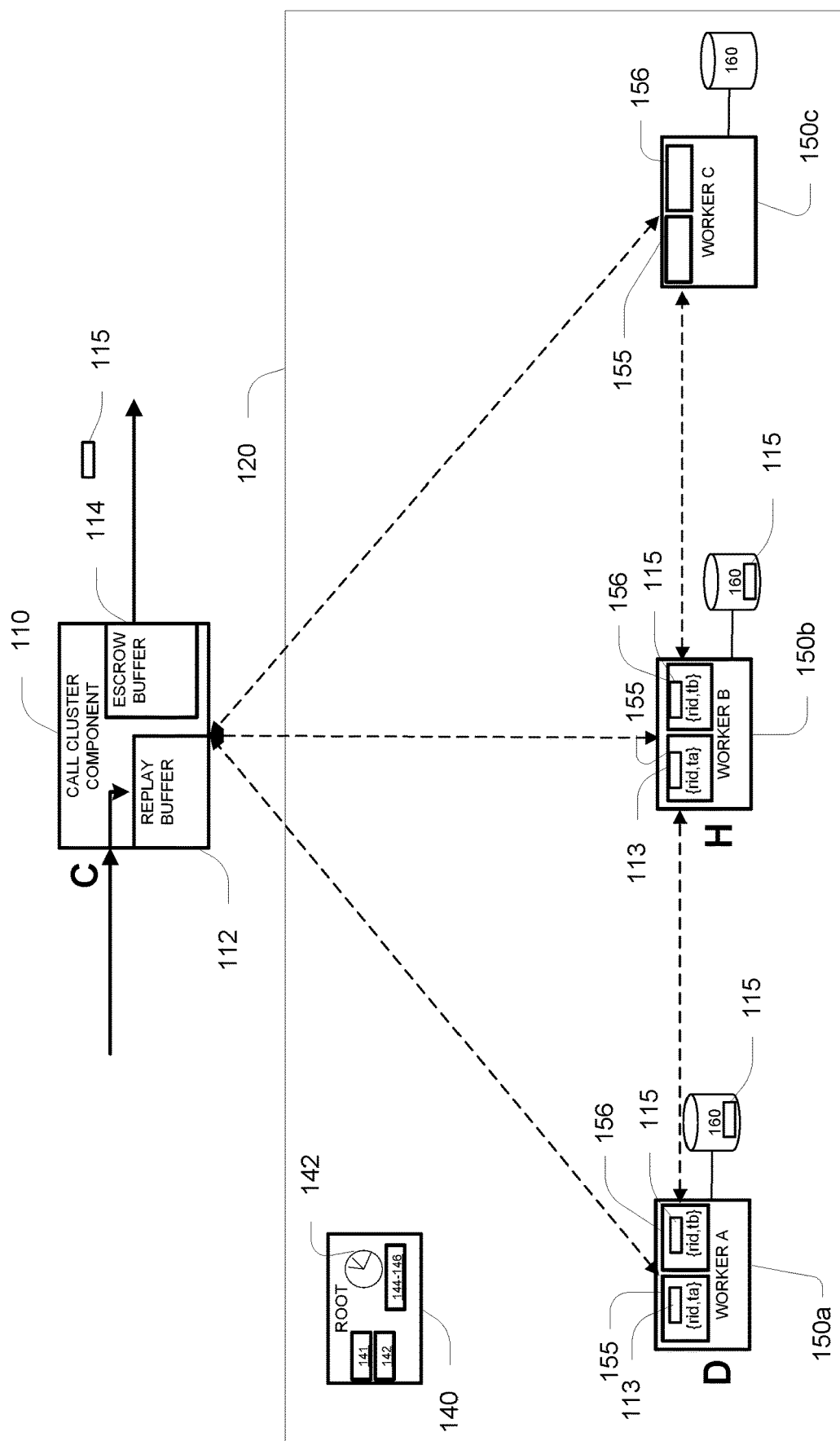

Referring to FIG. 11, the escrow time for this example is the persistence time, T3, so with T3 updated to tb, the request 113 stored at the call cluster component 110 enters state C and the response 115 (which is associated with time tb) is released from its escrow buffer 114.

Figure 12:
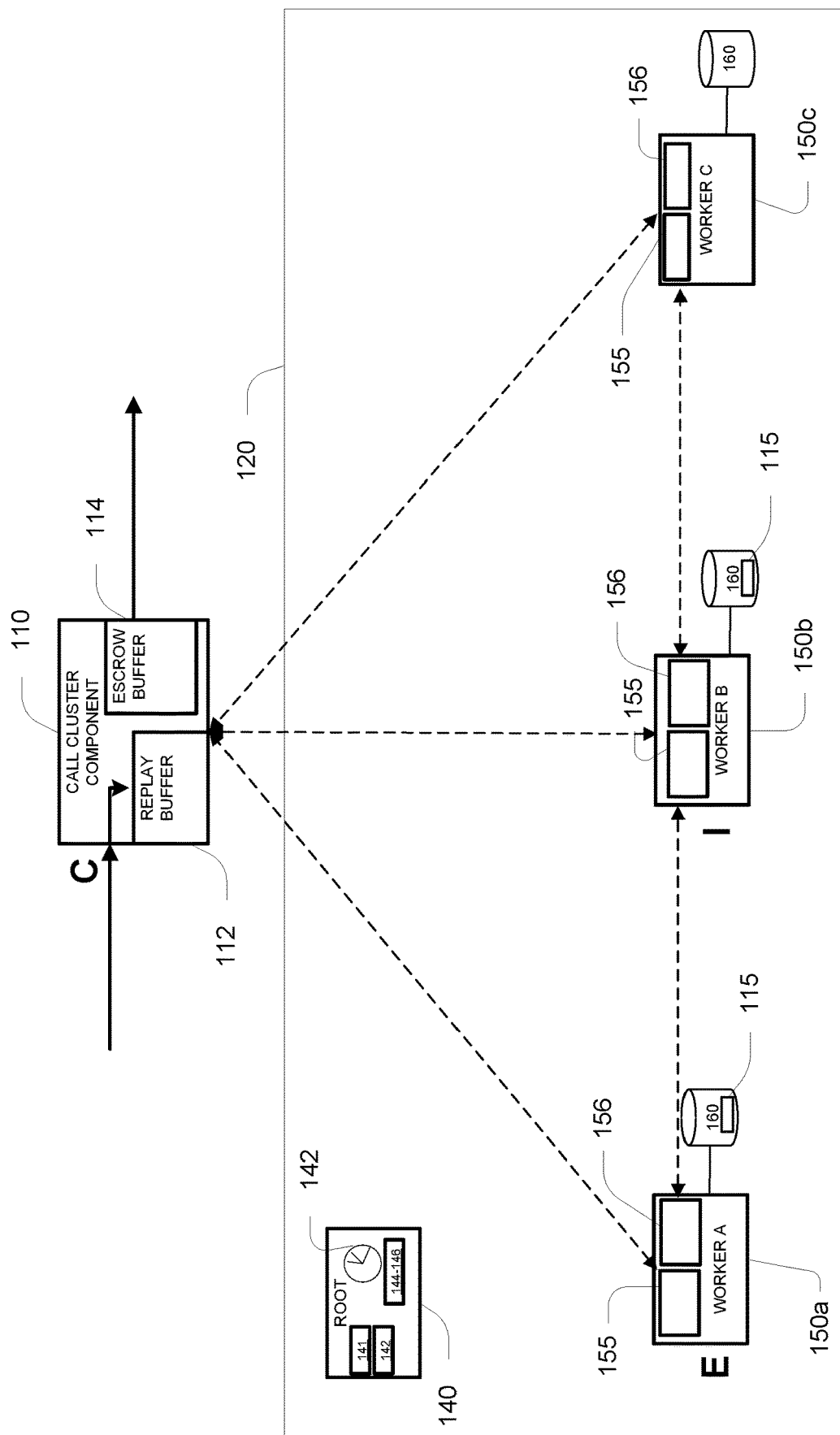

Referring to FIG. 12, with the response 115 permanently stored in the persistent storage of the primary worker 150a, the request 113 enters state E at which neither the request 113 nor the response 115 are stored in its volatile memories 155, 156, respectively. Similarly, with response 115 permanently stored in the persistent storage of the backup worker 150b, the request 113 enters state I at which neither the request 113 nor the response 115 are stored in its volatile memories 155, 156.

3 Rollback Scenarios

While the state transition diagram in FIG. 4 represents normal operation, it is possible, but infrequent, that messages between the workers are not successfully received. Furthermore, it is possible for a worker to have to restart after losing its volatile memory, or for a worker to fail entirely such that it does not further process requests (i.e., in either a primary or backup role). It is noted that that some embodiments of the data processing system described herein implement all of the rollback scenarios described in this section. It is also noted that other embodiments of the data processing system may implement one or more but not all of the rollback scenarios described in this section.

3.1 Scenario 1: tr<ta

Consider first a situation in which the cluster determines that there is some inter-worker message that was not successfully received, and that message was associated with a time te. Generally, the root informs all the workers that time must be "rolled back" to a time tr prior to te (i.e., tr<te), for example, to tr=te−1. Even with such a rollback, the results provided by the call cluster component 110 are provided to the application or graph as if the rollback did not occur, and the updates to the data distributed among the workers remains consistent with the results provided by the call cluster component. In particular, the result is not released from the call cluster component 110 to the application or graph until it is stored (e.g., replicated or persisted) at a number of nodes (e.g., workers), ensuring that the result will never be recalled or become invalid. Put another way, any rollback that occurs necessarily occurs prior to the result being provided by the call cluster component 110 to the application or graph.

When the root 140 determines that a rollback must be performed because some inter-worker message was not successfully received, the root informs the call cluster component 110 of the rollback time tr. The current time T1 is incremented, and generally, all activity from time tr+1 up to and include T1-1 are treated as if they had not occurred. The effect at the call cluster component 110 is that all requests, which are stored in the replay buffer 112, in state B (i.e., with response times that have not been reached by the escrow time) are returned to state A and any corresponding responses 115 in the escrow buffer 114 are discarded. Then, requests 113 that are in state A (either because they were already in state A or they were returned to state A from state B) are resent to the cluster 120.

The effect in the cluster (i.e., at the workers 150) on a request that has not yet begun execution, but that has been replicated between the primary and backup workers (i.e., the primary is in state A and the backup is in state F) is considered first for the situation in which the request has a request time ta that is greater than the rollback time tr (i.e., tr<ta). For this illustration, the current working time is denoted tc. Because ta is greater than tr, the call cluster component cannot assume that the request has replicated properly, and therefore versions of the request stored in the volatile memories 155 of the primary worker and the backup worker are removed. The request 113 is received from the call cluster component 110 at the cluster 120 with the same request id, rid, and is associated with a new request time, tc. When the primary worker receives the request 113, it stores the request 113 in its volatile memory 155 in state A. The primary worker sends the request 113 to the backup worker(s) 150, which stores the request 113 in its volatile memory 155 in state F. Further processing at the primary and the backup then proceeds in the manner illustrated in FIG. 4.

Note that if the backup was not aware of the request prior to receiving the updated request with time tc from the primary, it would also proceed in the same manner with the request having now been properly replicated.

Figure 13:
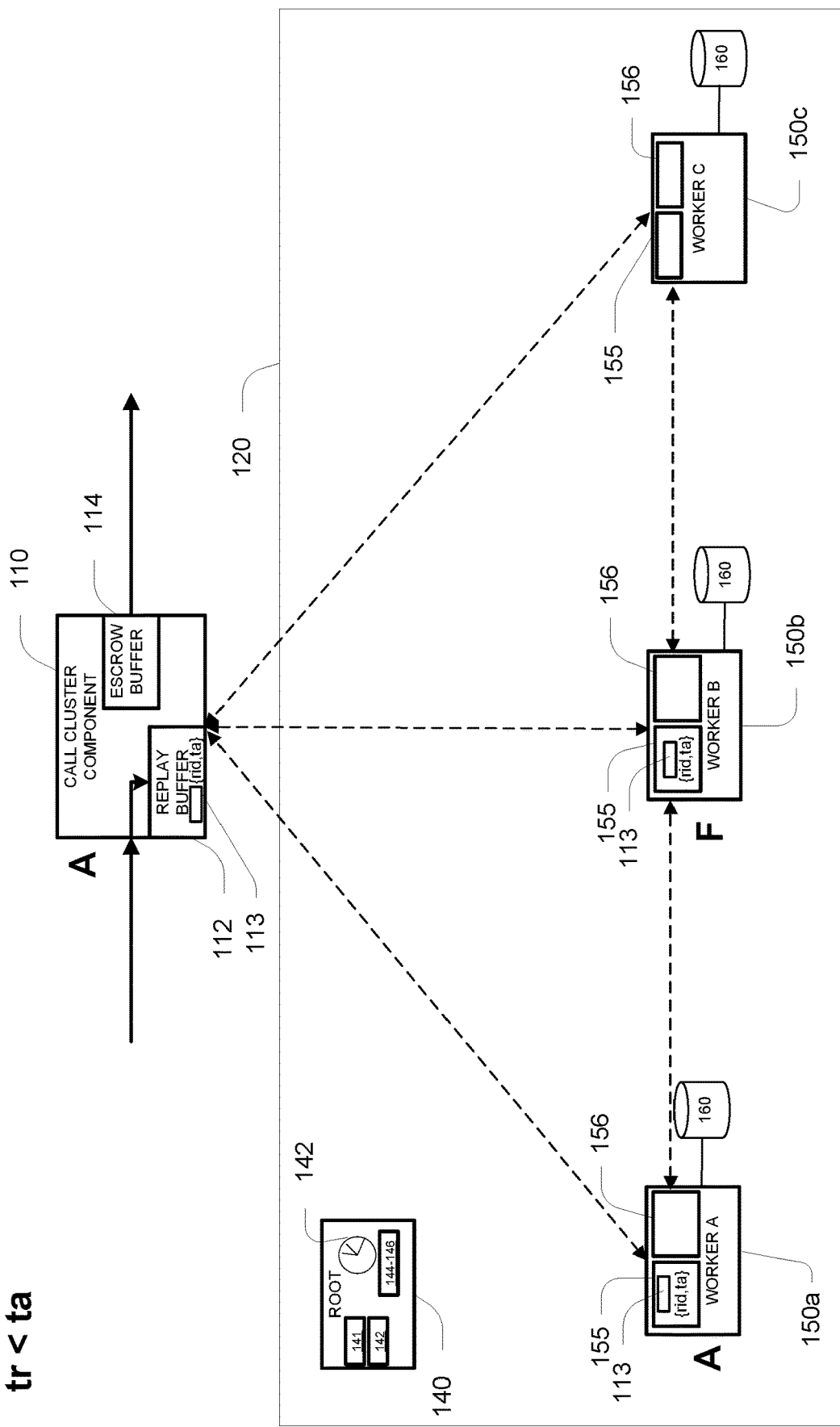
FIGS. 13 to 15 illustrate a first rollback procedure.
Figure 14:
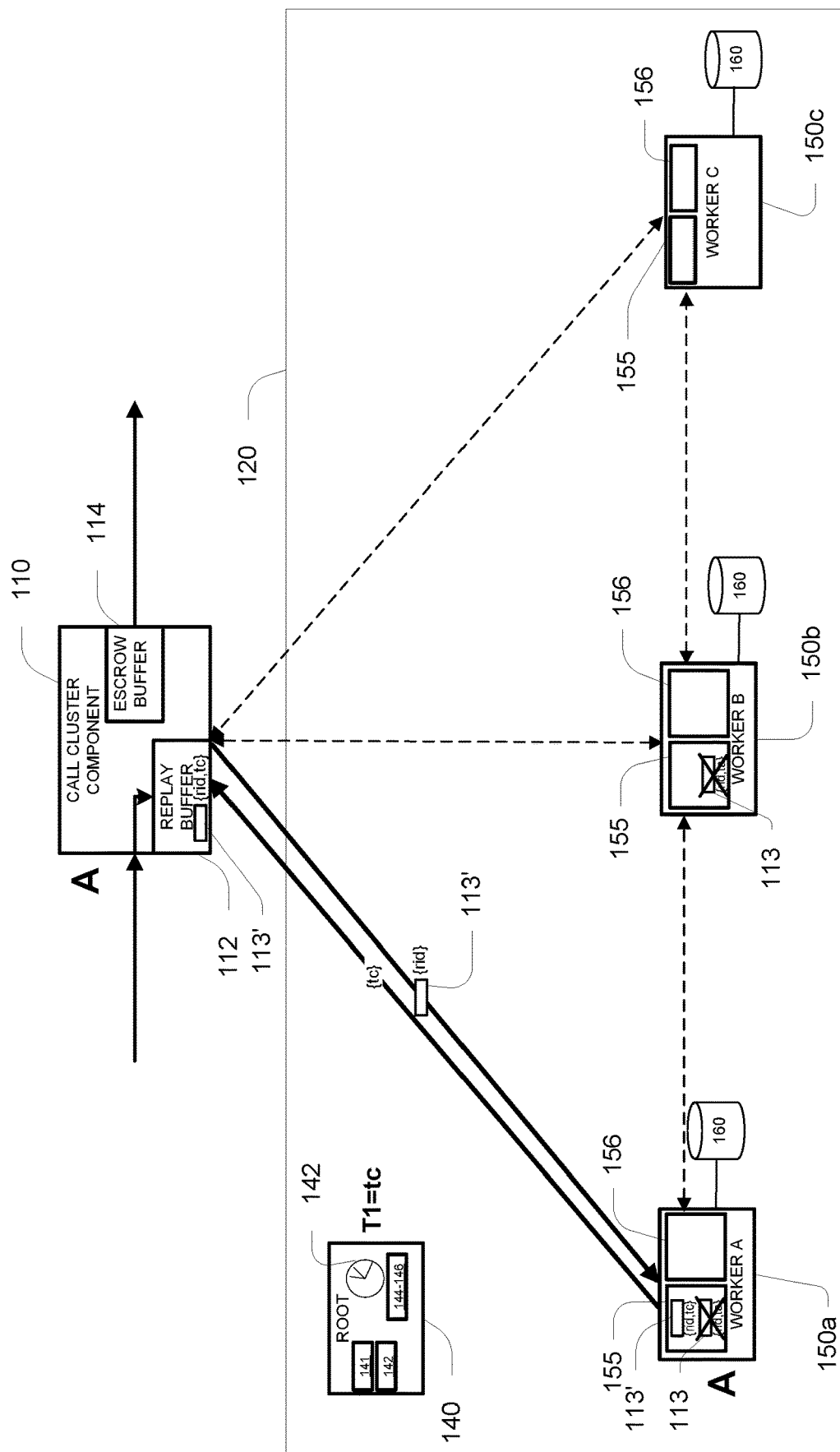
Figure 15:
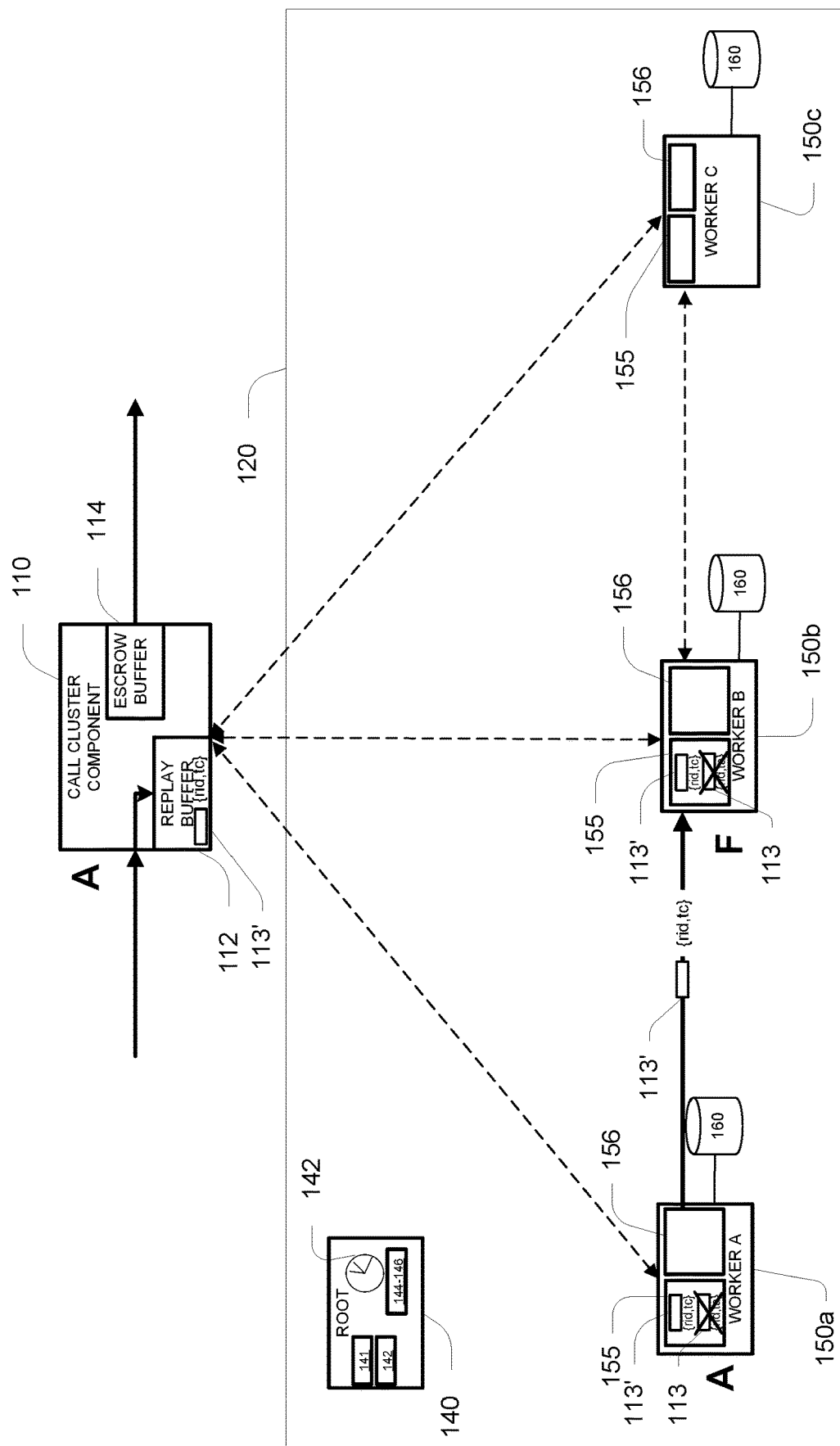

Referring to FIGS. 13-15, one example of the first rollback scenario is shown. In FIG. 13, a request 113 issued at time ta is stored in the replay buffer 112 at the call cluster component 110 and is in state A. The request 113 is stored in the volatile memory 155 at the primary worker and is in state A because it has not yet begun execution. The request 113 is also stored at the backup worker 150b and is in state F.

A rollback request is received to roll the system back to a time tr<ta. In FIG. 14, after the rollback request is received, the request 113 is removed from the volatile memory 155 of the primary worker 150a and from the volatile memory 155 of the backup worker 150b. A new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'. The new request 113' in the replay buffer 112 is in state A.

In the cluster, the new request 113' is sent to the primary worker. The primary worker 150a stores the new request 113' in its volatile memory 155 with the request time, tc. The new request 113' stored in the volatile memory 155 of the primary worker 150a is in state A.

Referring to FIG. 15, the primary worker sends the new request 113' to the backup worker 150b. The backup worker 150b stores the new request 113' in its volatile memory 155 and associated with request time, tc. The updated request 113' stored in the volatile memory 155 of the backup worker is in state F.

The cluster then proceeds according to its normal operation (as set forth in FIGS. 5-12).

3.2 Scenario 2: tr<ta, Execution has Begun

In a second situation, the request time, ta, of the earlier request is greater than the rollback time tr (i.e., tr<ta), but the request has started execution and has not completed execution at the primary worker (i.e., the request is in state B at the primary worker, possibly with a partial response 115 computed, and the request is in state F at the backup worker). In this case, the execution is terminated and the partial response 115 is discarded (or execution is allowed to complete, and the response discarded) at the primary worker and backup workers and the call cluster component 110 re-sends the request 113 to the cluster 120. The requests stored at the primary and backup workers return to states A and F, respectively. The primary worker informs the backup of the request in the same manner as if the requests had not begun execution at the primary worker.

Figure 16:
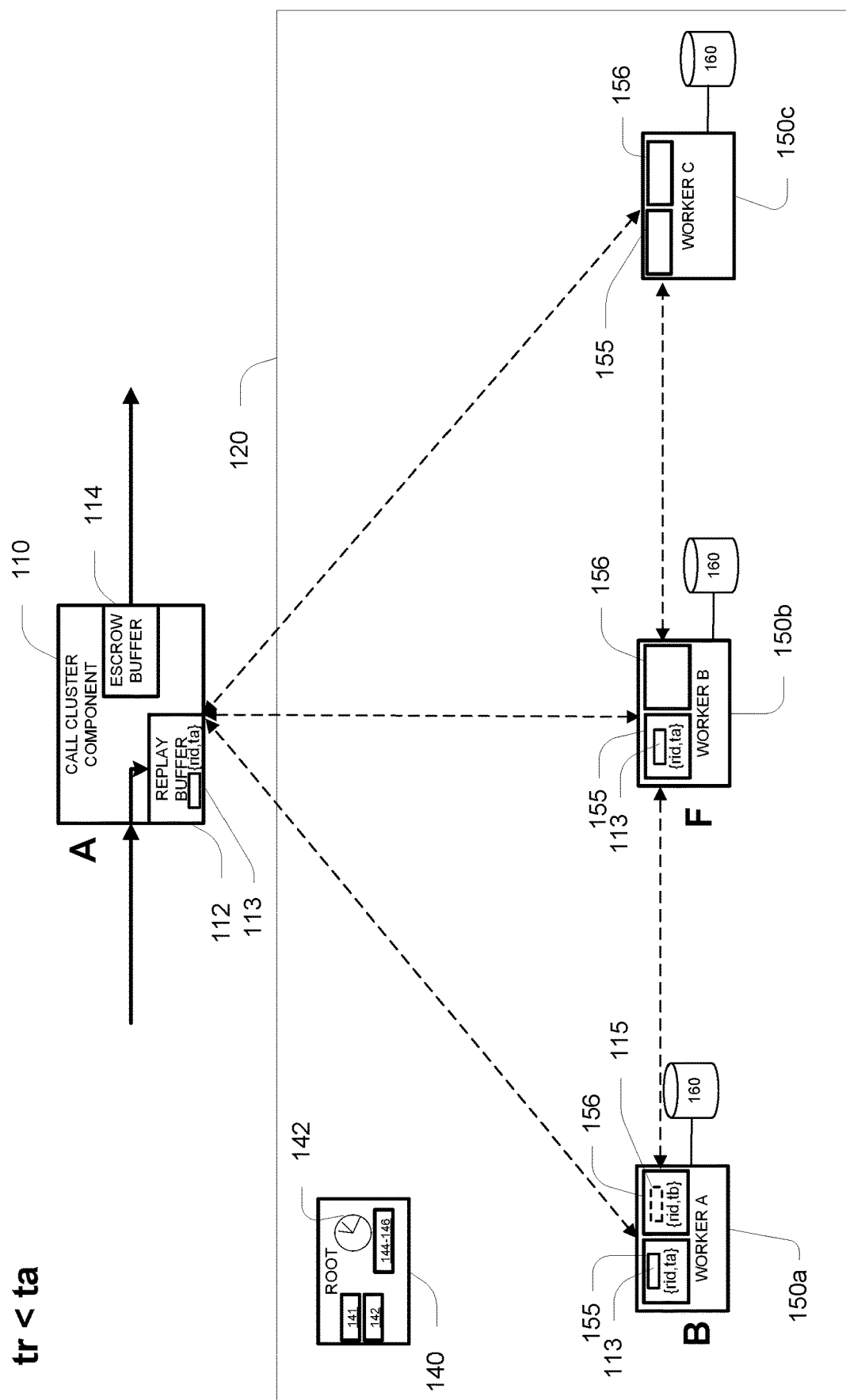
FIGS. 16 to 18 illustrate a second rollback procedure.
Figure 17:
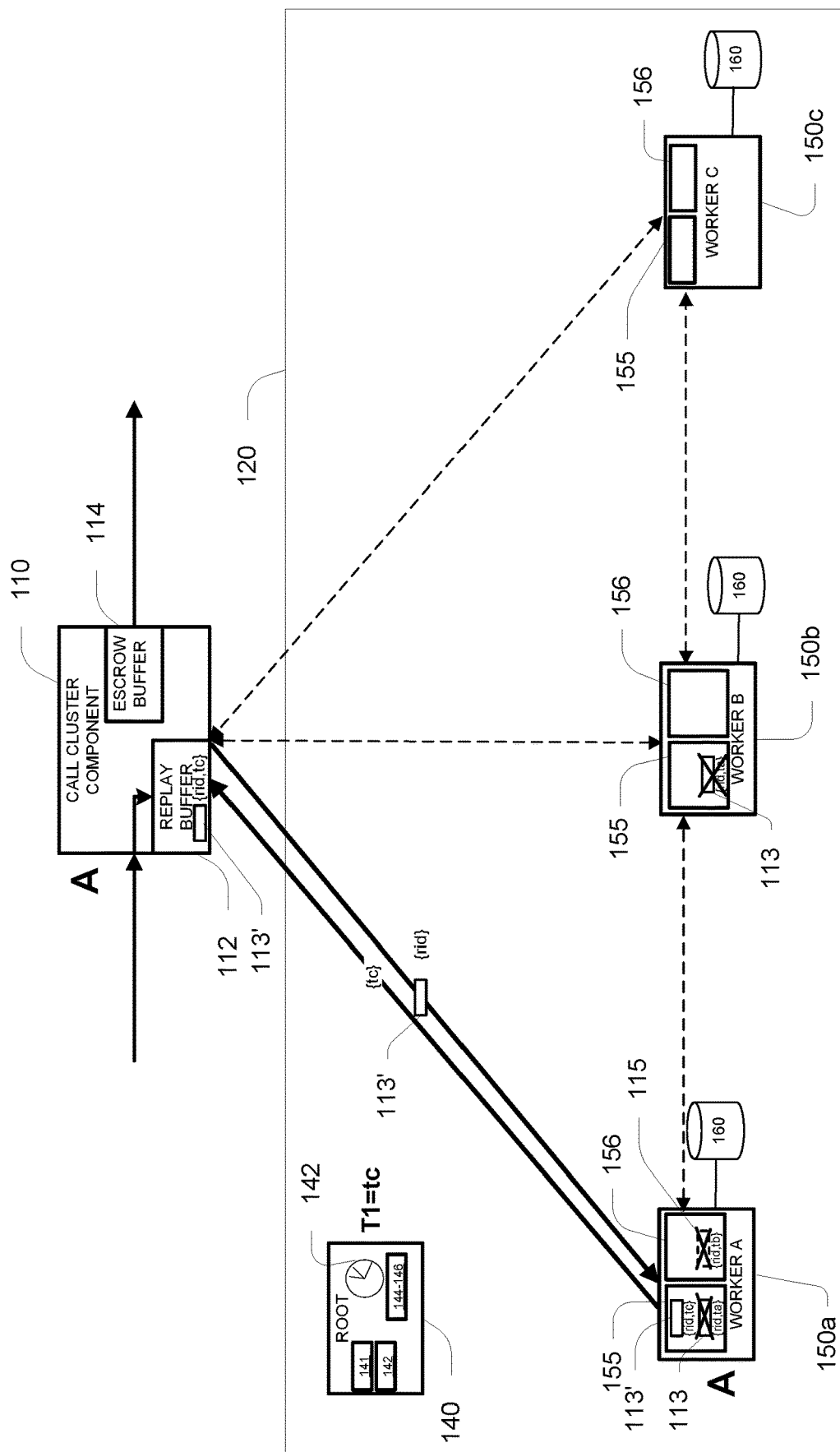
Figure 18:
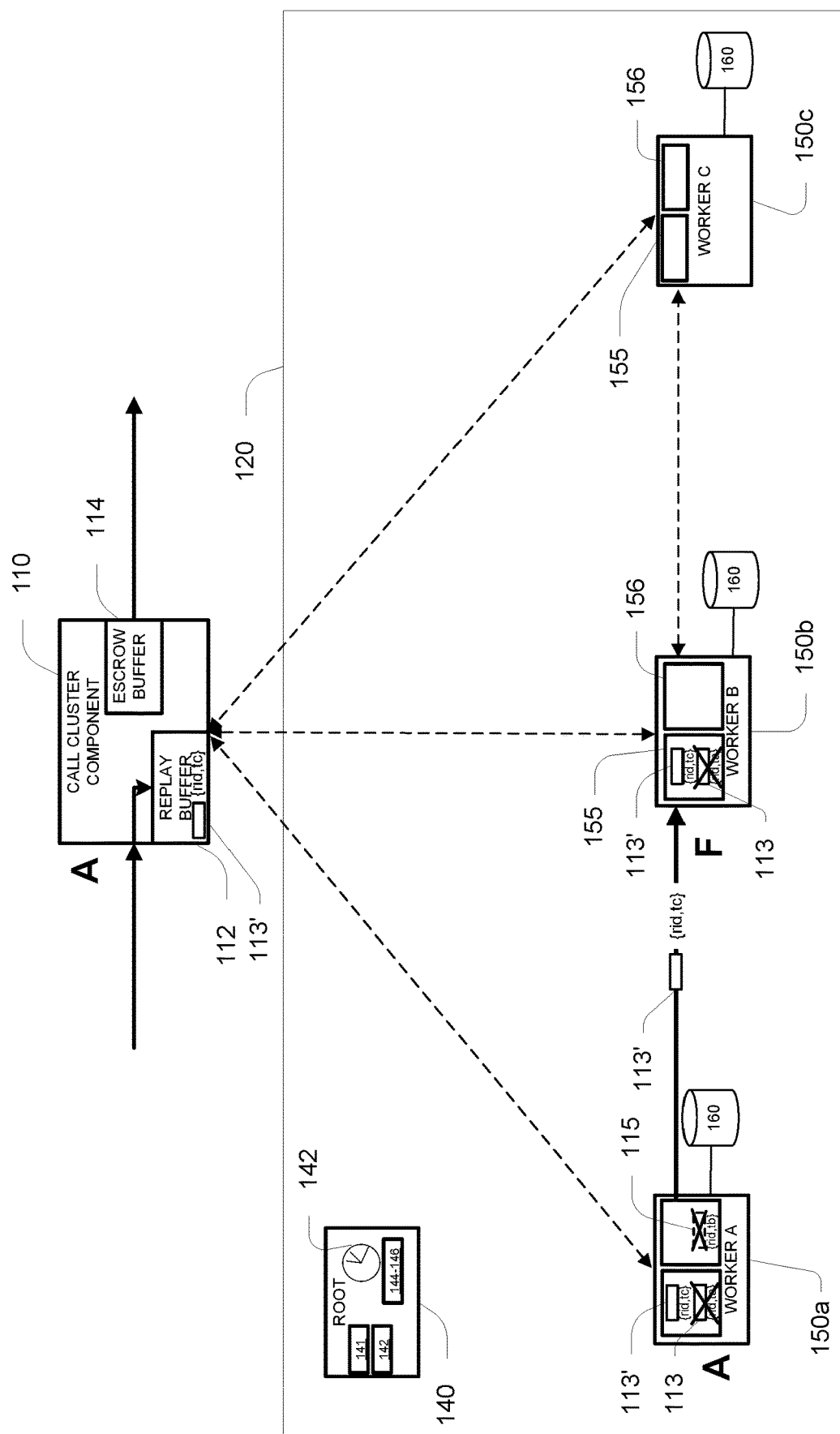

Referring to FIGS. 16-18, one example of the second rollback scenario is shown. In FIG. 16, a request 113 issued at time ta is stored in the replay buffer 112 at the call cluster component 110 and is in state A. The request 113 is stored in the volatile memory 155 at the primary worker 150a and is in state B because it has begun execution. The request is also stored at the backup worker 150b and is in state F.

A rollback request is received to roll the system back to a time tr<ta. In FIG. 17, after the rollback request is received, the request 113 is removed from the volatile memory 155 of the primary worker 150a and from the volatile memory 155 of the backup worker 150b. A new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'. The new request 113' in the replay buffer 112 is in state A.

In the cluster, the new request 113' is sent to the primary worker. The primary worker 150a stores the new request 113' in its volatile memory 155 with the request time, tc. The new request 113' stored in the volatile memory 155 of the primary worker 150a is in state A.

Referring to FIG. 18, the primary worker 150a sends the new request 113' to the backup worker 150b. The backup worker 150b stores the new request 113' in its volatile memory 155 and associated with request time, tc. The updated request 113' stored in the volatile memory 155 of the backup worker is in state F.

The cluster then proceeds according to its normal operation (as set forth in FIGS. 5-12).

3.3 Scenario 3: tr<ta<tb, Execution has Completed

In a third situation, the request time, ta, of the earlier request is again greater than the rollback time tr. However, in this case, we assume that the execution completed at a time tb (i.e., tr<ta≤tb), and the response has been replicated at the backup worker and received at the call cluster component 110. That is, the request 113 is in state B at the call cluster component 110, the request is in state C at the primary worker 150a, and the request 113 is in state G at the backup worker 150b. Rather than merely having to terminate execution of the in-progress execution as in the second situation, the responses 115 that have been stored at the primary and backup workers are removed. As introduced above with reference to FIG. 4, a response generated at a time tb is stored in a versioned data structure associated with time tb in such a manner that all updates at a particular time and later can be removed from the data structure. In the present situation, by removing all data versions updated later than time tr, the updates for the illustrated request made at time tb are necessarily removed, and the request is returned to state A at the primary worker with a request time of tc awaiting execution and returned to state F in the backup worker awaiting a response from the primary. At the call cluster component, the response is discarded, and the request is returned to state A.

Figure 19:
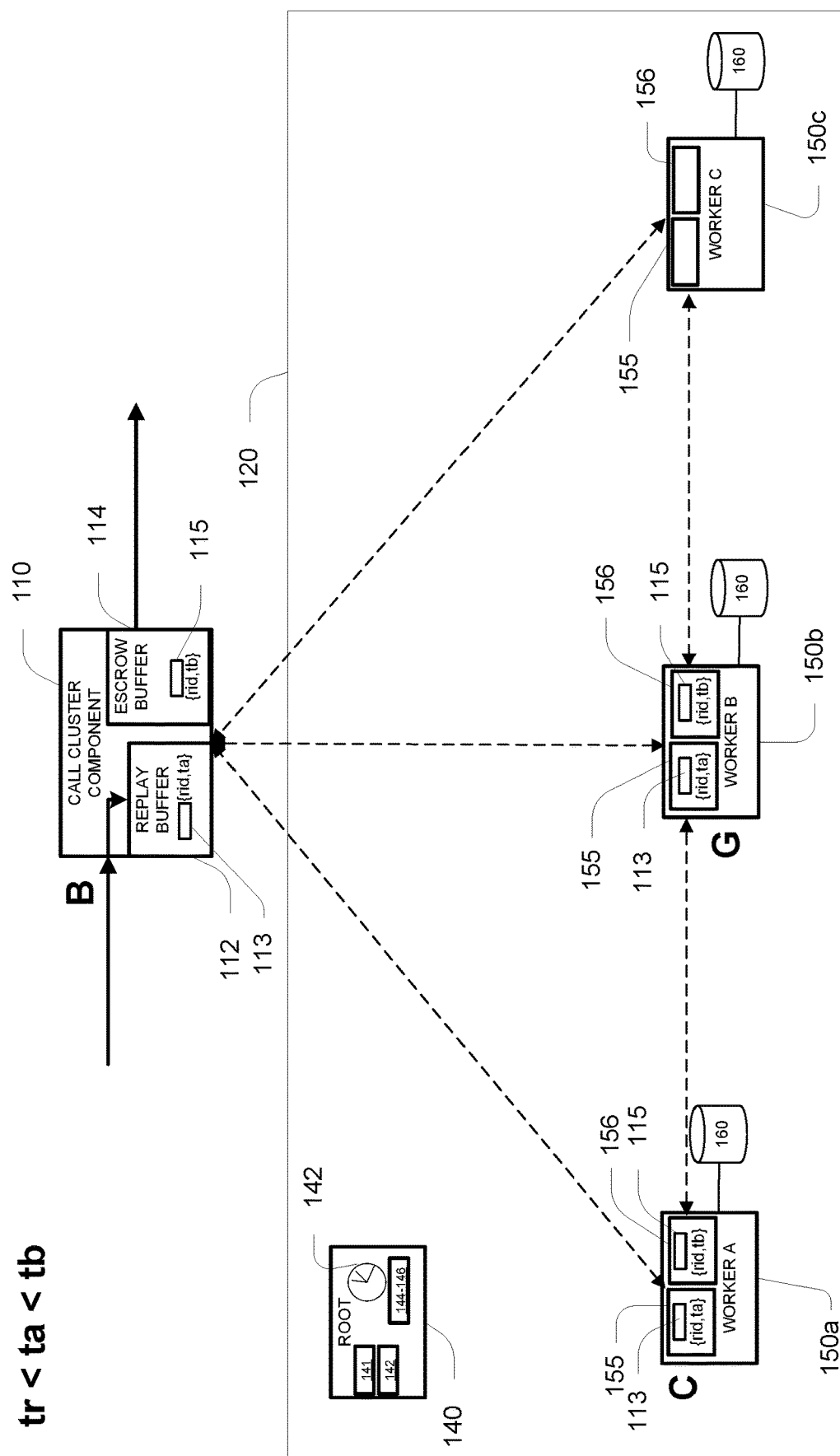
FIGS. 19 to 21 illustrate a third rollback procedure.
Figure 20:
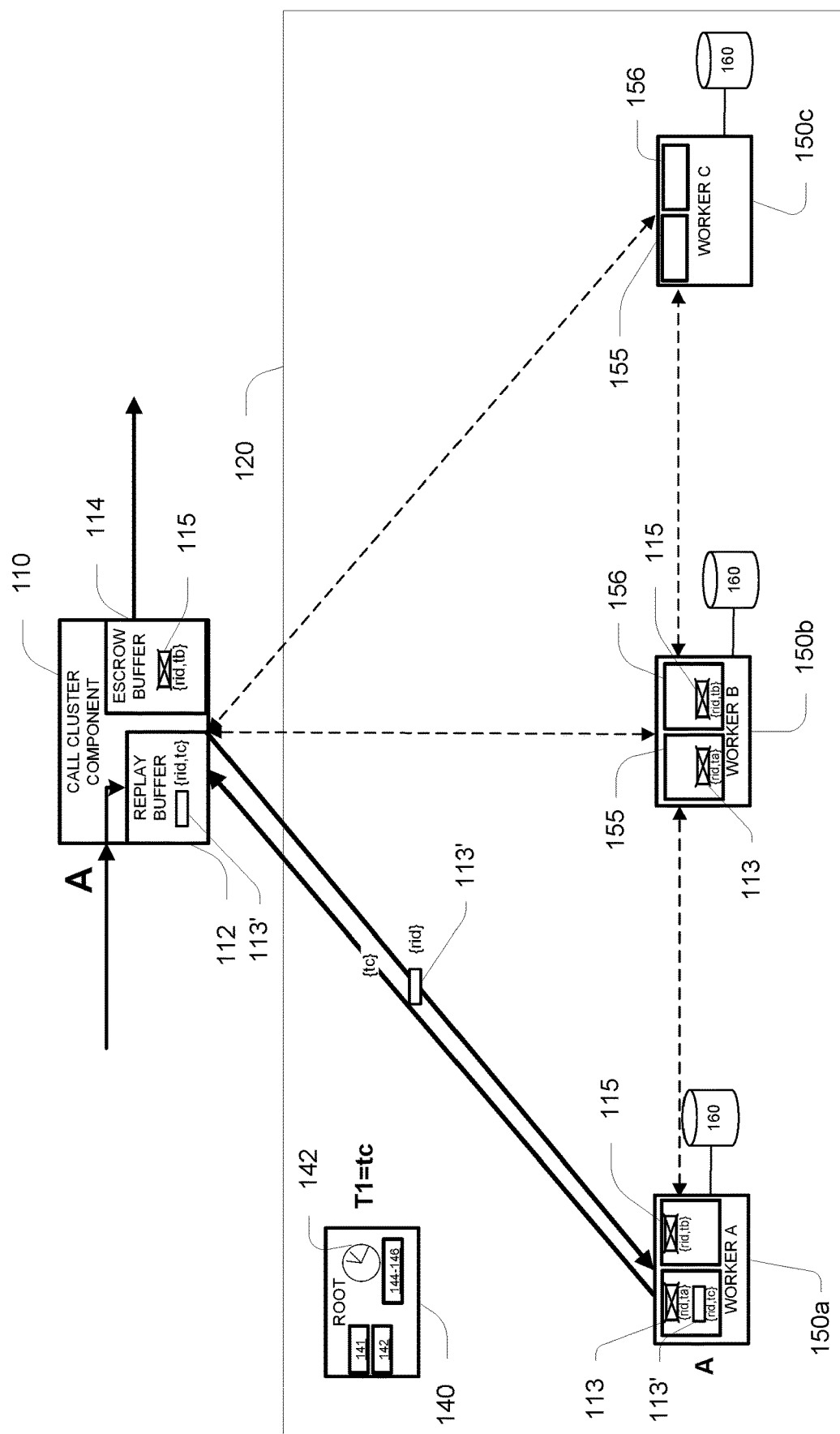
Figure 21:
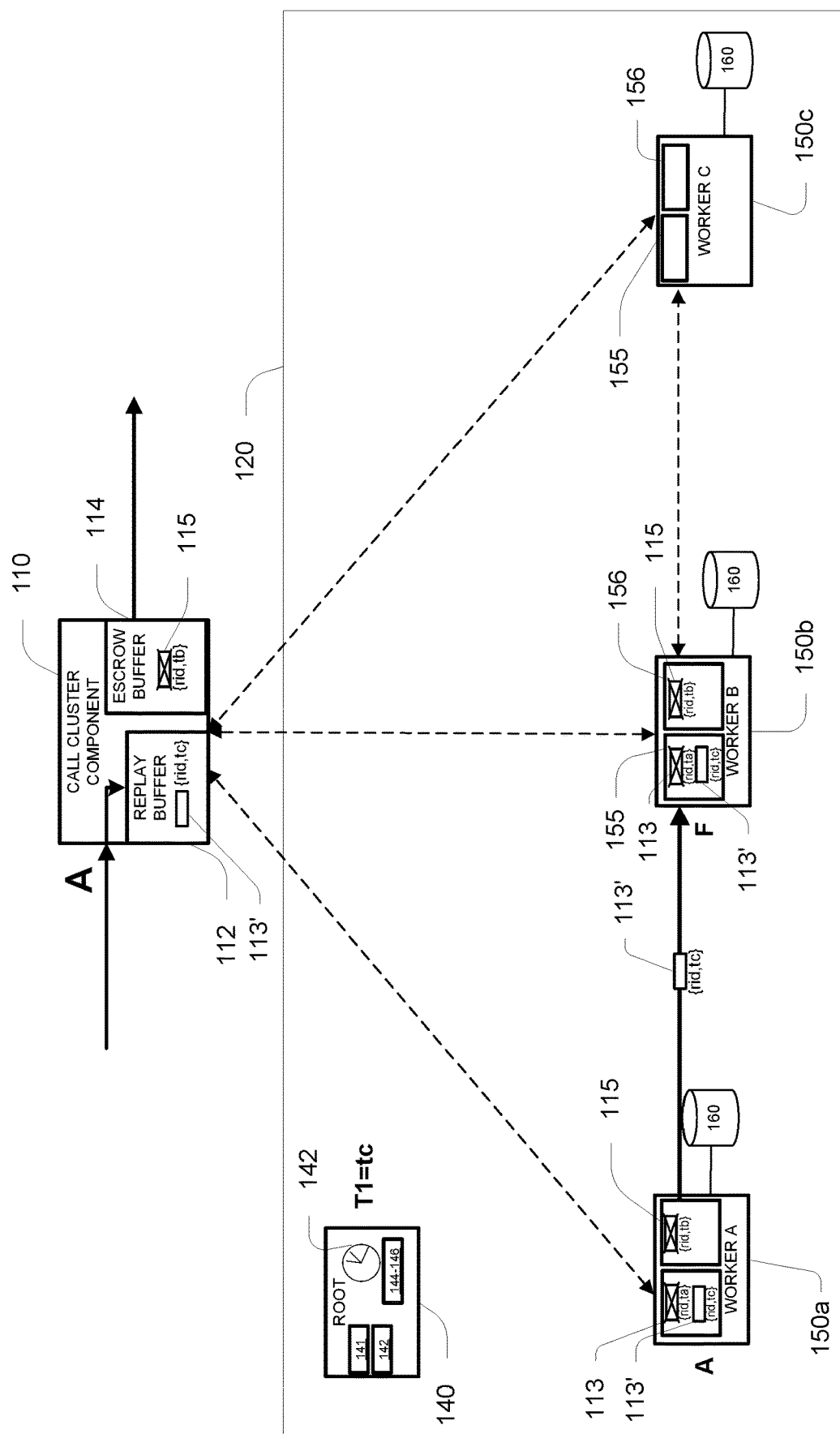

Referring to FIGS. 19-21, one simple example of the third rollback scenario is shown. In FIG. 19, a request 113 issued at time ta is stored in the replay buffer 112 at the call cluster component 110. A response to the request 115, generated at time tb is stored in the escrow buffer 114. The request 113 is therefore in state B at the call cluster component.

In the cluster, the request 113 and the response 115 are stored in volatile memory 155, 156 at the primary worker 150a. The request 113 is therefore in state C at the primary worker 150a. The request 113 and the response 115 are also stored in volatile memory 155, 156 at the backup worker. The request is therefore in state G at the backup worker 150b.

A rollback request is received to roll the system back to a time tr<ta<tb. In FIG. 20, after the rollback request is received, the response 115 is removed from the escrow buffer 114 of the call cluster component 110. In the cluster 120, both the request 113 and the response 115 are removed from the volatile memory 155 of the primary worker 150a and from the volatile memory 155 of the backup worker 150b.

A new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'. The new request 113' in the replay buffer 112 is in state A.

In the cluster, the new request 113' is sent to the primary worker 150a. The primary worker 150a stores the new request 113' in its volatile memory 155 with the request time, tc. The new request 113' stored in the volatile memory 155 of the primary worker 150a is in state A.

Referring to FIG. 21, the primary worker 150a sends the new request 113' to the backup worker 150b. The backup worker 150b stores the new request 113' in its volatile memory 155 and associated with request time, tc. The updated request 113' stored in the volatile memory 155 of the backup worker is in state F.

The cluster then proceeds according to its normal operation (as set forth in FIGS. 5-12).

3.4 Scenario 4: ta<tr, Execution has not Begun

In a fourth situation, a rollback time tr is at or after an original request time ta (i.e., ta≤tr) and the original request has not started executing. The request is retransmitted to the cluster 120 and is queued for execution behind the original request (i.e., {rid,ta}) at the primary worker and at the backup workers. The primary worker executes the original request and generates a response (i.e., {rid, tb}). The primary worker then proceeds to begin execution of the retransmitted request (i.e., {rid, tc}) but detects that a response associated with the rid of the retransmitted request is already present, and forgoes execution of the retransmitted request.

Figure 22:
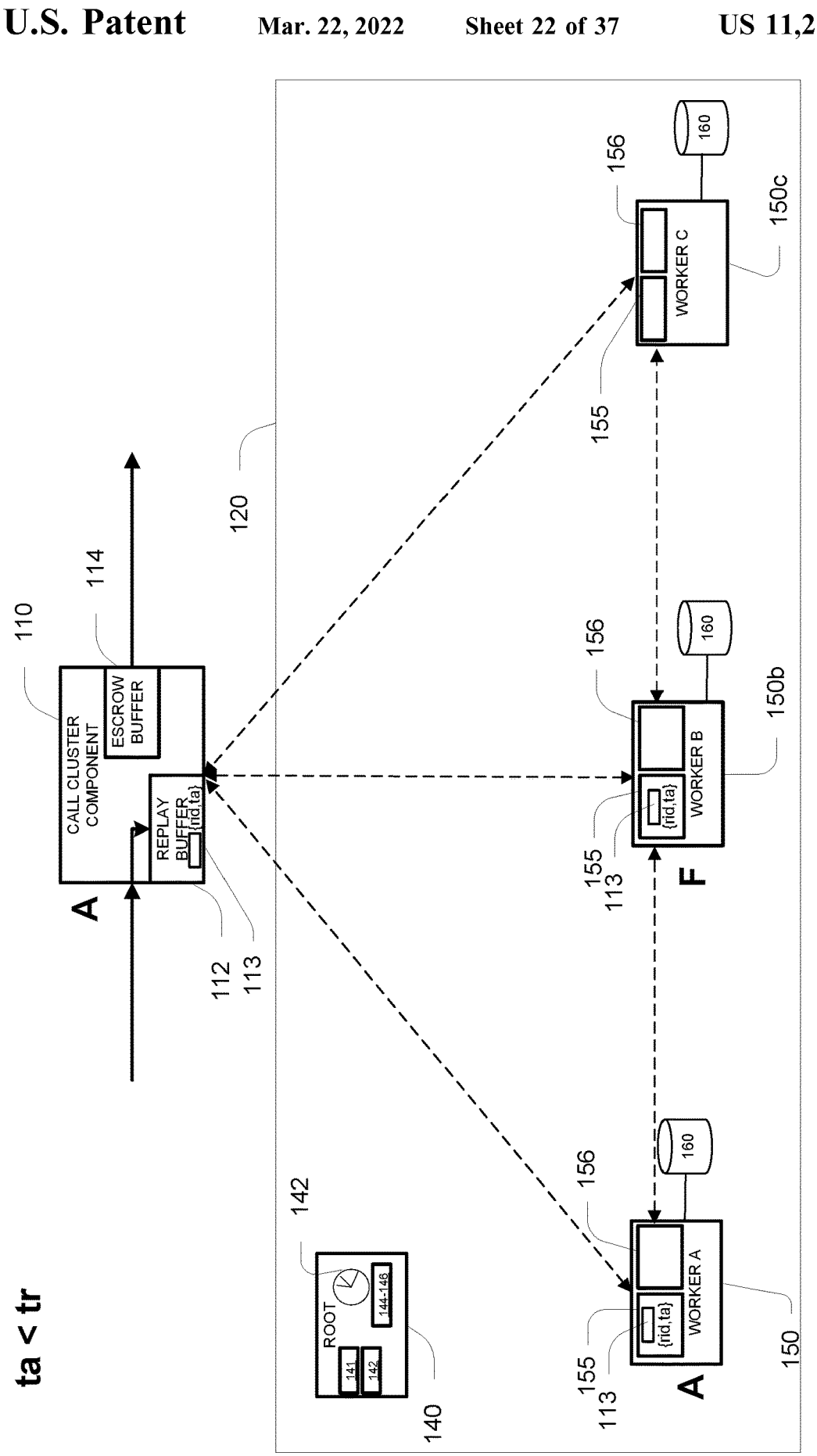
FIGS. 22 to 25 illustrate a fourth rollback procedure.

Referring to FIGS. 22-25, one example of the fourth rollback scenario is shown. In FIG. 22, an original request 113 issued at time ta is stored in the replay buffer 112 at the call cluster component 110 and is in state A. The original request 113 is stored in the volatile memory 155 at the primary worker 150a and is in state A because it has not yet begun execution. The original request 113 is also stored at the backup worker 150b and is in state F.

Figure 23:
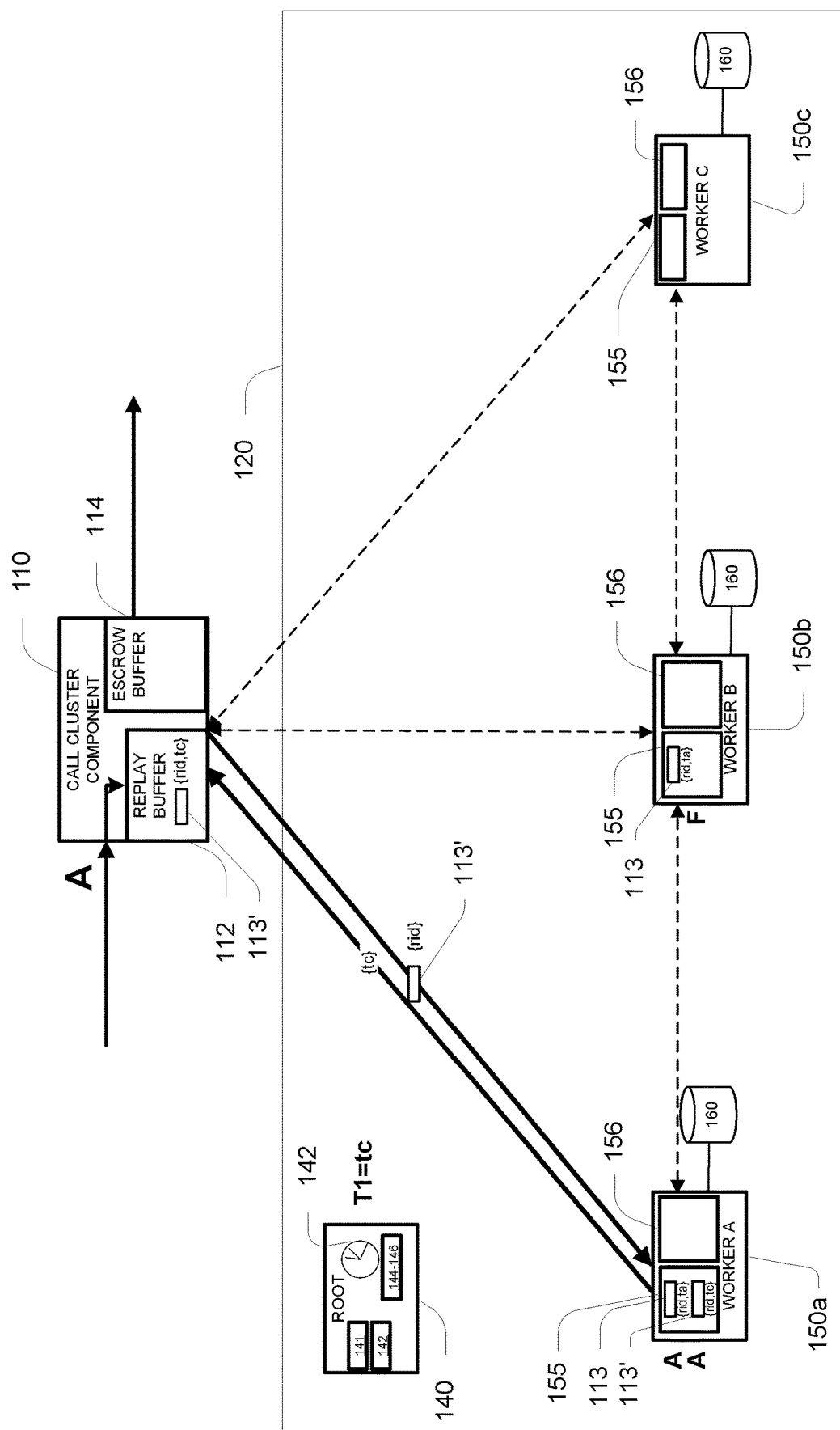

A rollback request is received to roll the system back to a time ta<tr. In FIG. 23, a new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'. The request 113 in the replay buffer 112 remains in state A.

In the cluster, the new request 113' is sent to the primary worker 150a. The primary worker 150a receives the new request 113' and queues the new request 113' behind the original request 113 for execution. Both the original request 113 and the new request 113' stored in the volatile memory 155 of the primary worker 150a are in state A.

Figure 24:
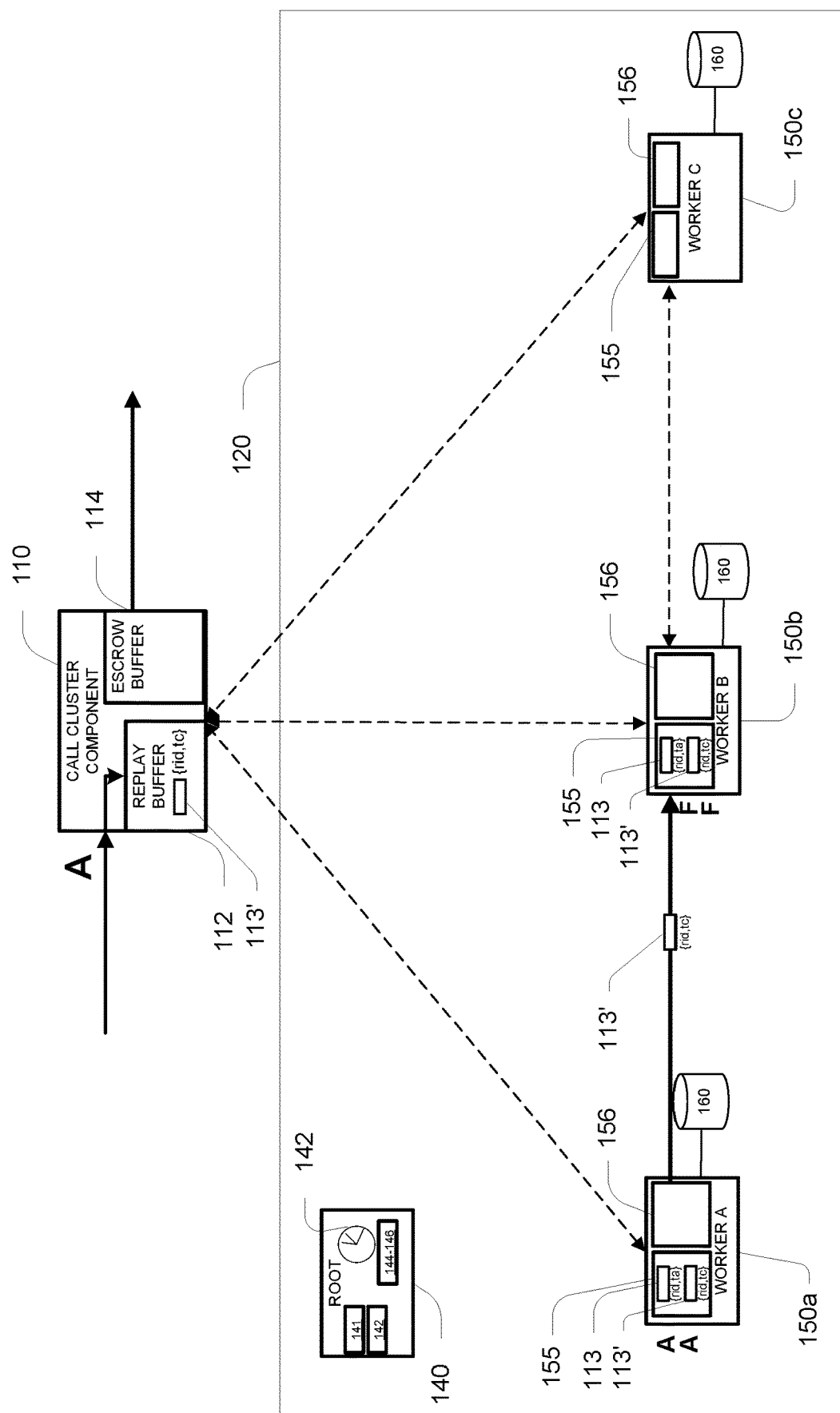

Referring to FIG. 24, the primary worker 150a sends the new request 113' to the backup worker 150b. The backup worker 150b receives the new request 113' and queues the new request 113' behind the original request 113 for execution. Both the original request 113 and the new request 113' stored in the volatile memory 155 of the backup worker 150b are in state F.

Figure 25:
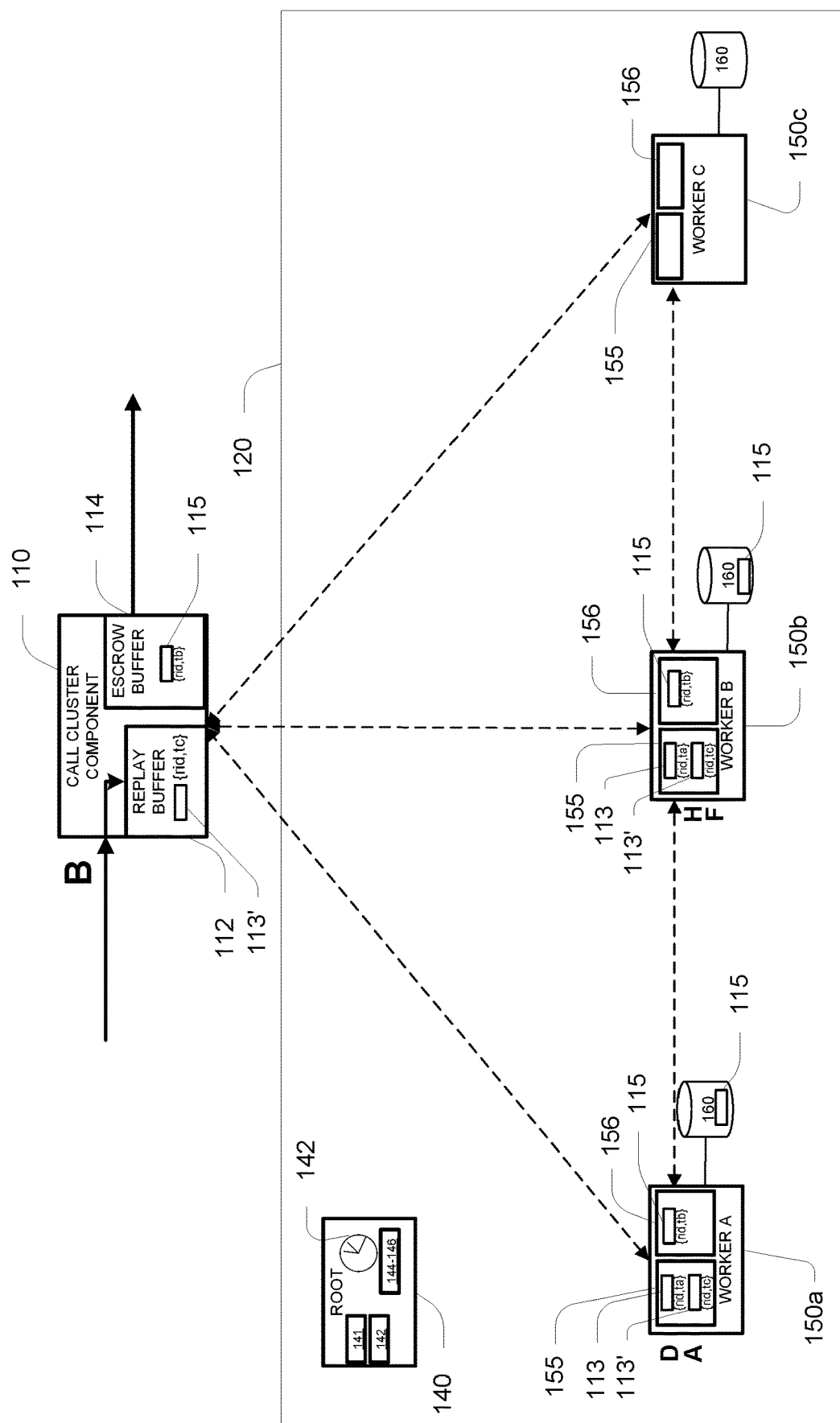

Referring to FIG. 25, the primary worker 150a has executed the original request 113 to generate a response 115 and the response 115 is persisted in its persistent storage 160. As a result, the original request 113 is in state D at the primary worker 150a. The new request 113' has not yet begun execution at the primary worker 150a and is therefore in state A.

The response 115 has also been provided to the backup worker 150b and to the call cluster component 110. The backup worker 150b has stored the response 115 in its volatile memory 156 and has persisted the response to its persistent storage 160. The original request 113 is therefore in state H at the backup worker. The call cluster component 110 has stored the response 115 in its escrow buffer 114 and the request 113 in the call cluster's component's replay buffer 112 is in state B.

When the new request 113' begins execution at the primary worker 150a, the primary worker 150a recognizes that the new request 113' is associated with the same request identifier, rid as the response 115 and therefore does not execute the new request 113' because it is a duplicate. In some examples, the response 115 may be retransmitted to the call cluster component, which disregards the response 115 as a duplicate.

The cluster then proceeds according to its normal operation (as set forth in FIGS. 5-12).

3.5 Scenario 5: ta<tr, Execution has Begun

In a fifth situation, a rollback time tr is at or after an original request time ta (i.e., ta≤tr) and the original request has started executing, but has not completed execution at the primary worker (i.e., the request is in state B at the primary worker and the request is in state F at the backup worker). In this situation, execution is terminated (or allowed to complete and the response is discarded) at the primary worker and the backup workers (i.e., requests stored at the primary and backup workers return to states A and F, respectively).

The call cluster component 110 retransmits the request to the cluster 120, where it is queued for execution behind the original request (i.e., {rid,ta}) at the primary worker and at the backup workers. The primary worker executes the original request and generates a response (i.e., {rid, tb}). The primary worker then proceeds to begin execution of the retransmitted request (i.e., {rid, tc}) but detects that a response associated with the rid of the retransmitted request is already present, and forgoes execution of the retransmitted request.

Figure 26:
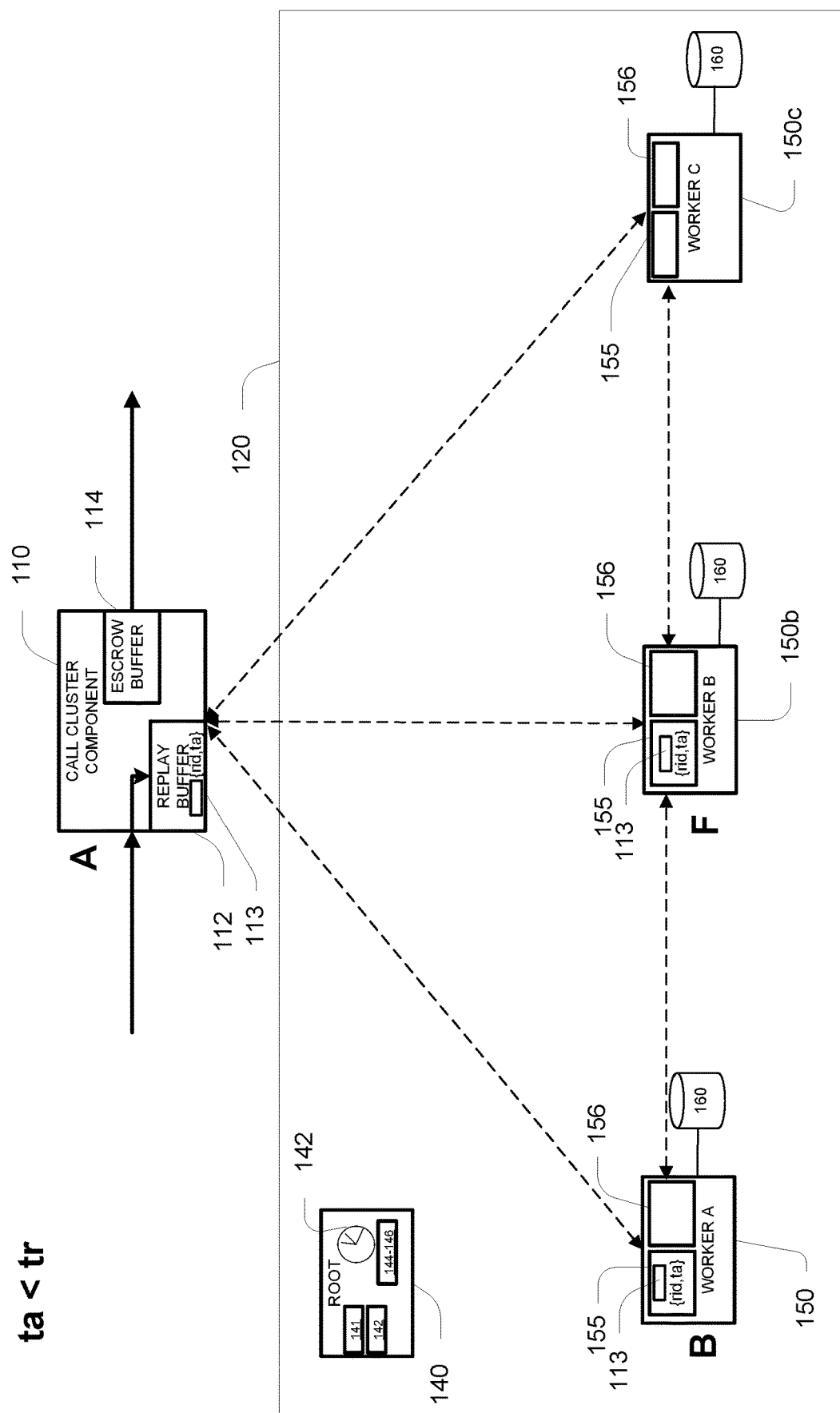
FIGS. 26 to 29 illustrate a fifth rollback procedure.

Referring to FIGS. 26-29, one example of the fifth rollback scenario is shown. In FIG. 26, an original request 113 issued at time ta is stored in the replay buffer 112 at the call cluster component 110 and is in state A. The original request 113 is stored in the volatile memory 155 at the primary worker 150a and is in state B because it has begun execution. The original request 113 is also stored at the backup worker 150b and is in state F.

Figure 27:
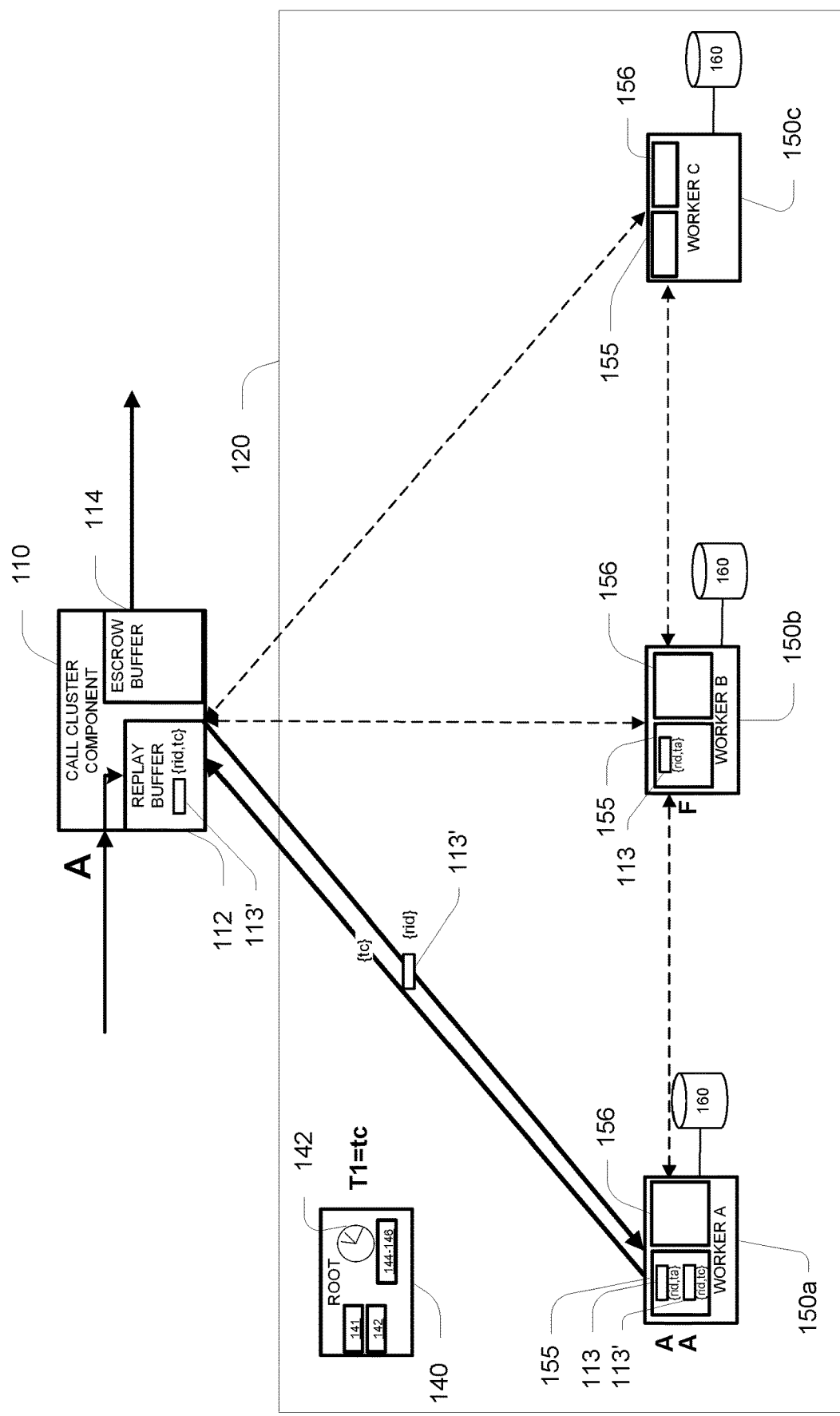

A rollback request is received to roll the system back to a time ta<tr. In FIG. 27, a new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'. The request 113 in the replay buffer 112 remains in state A. In the cluster 120, execution of the original request 113 stored in the volatile memory 155 of the primary worker 150a is terminated and the original request 113 is returned to state A. The new request 113' is sent to the primary worker 150a. The primary worker 150a receives the new request 113' and queues the new request 113' behind the original request 113 for execution. The new request 113' stored in the volatile memory 155 of the primary worker 150a is in state A.

Figure 28:
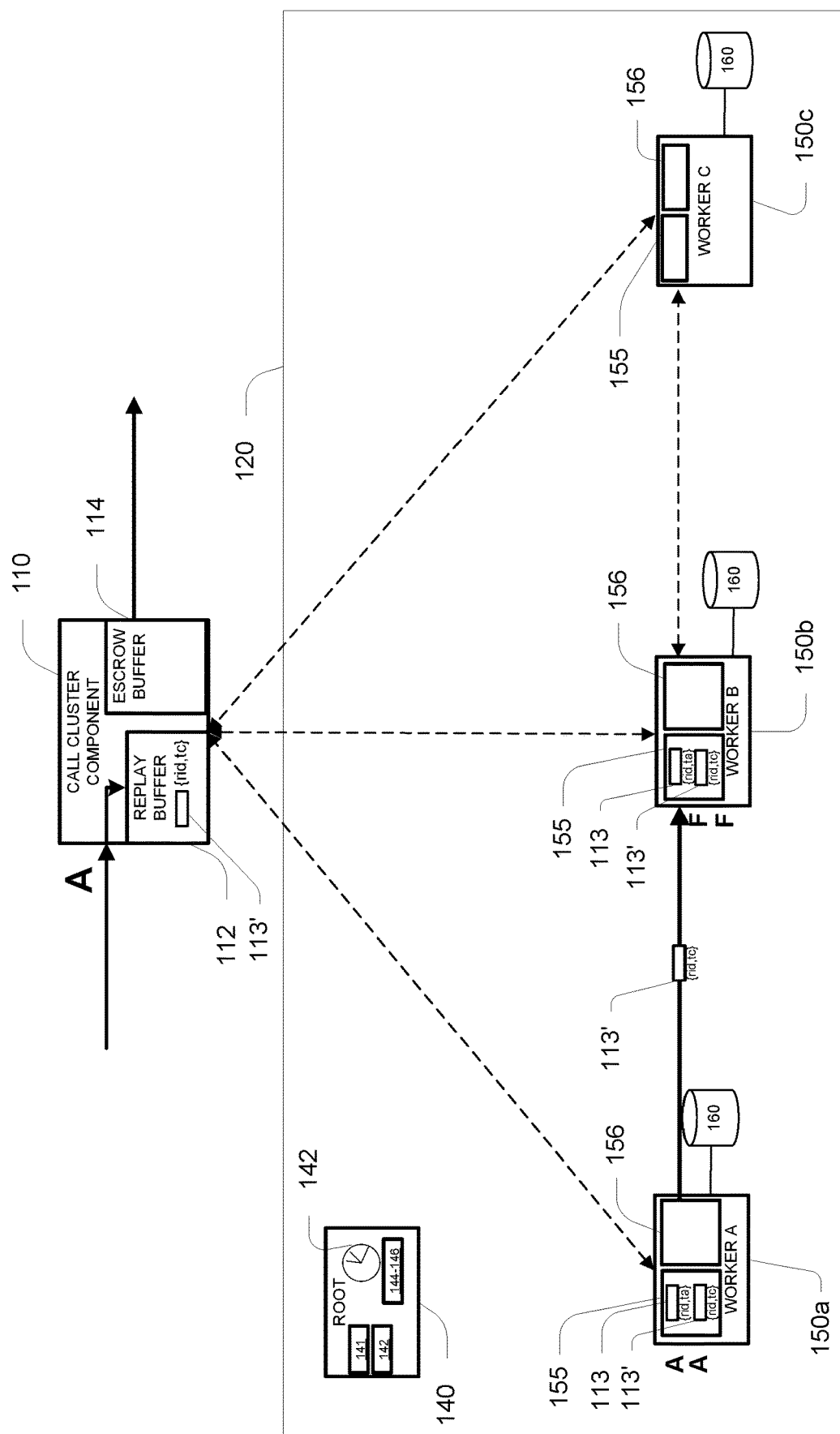

Referring to FIG. 28, the primary worker 150a sends the new request 113' to the backup worker 150b. The backup worker 150b receives the new request 113' and queues the new request 113' behind the original request 113 for execution. Both the original request 113 and the new request 113' stored in the volatile memory 155 of the backup worker 150b are in state F.

Figure 29:
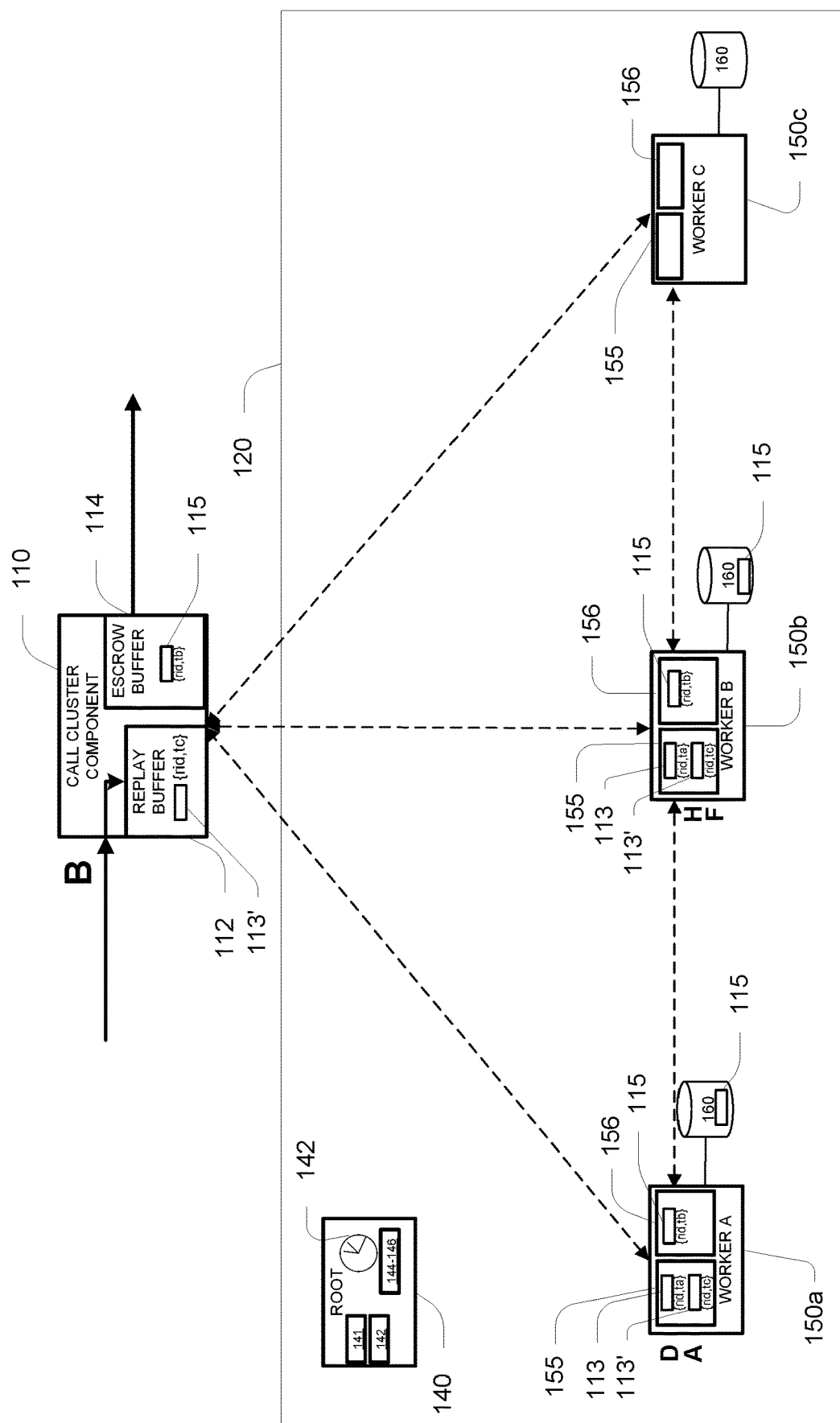

Referring to FIG. 29, the primary worker 150a has executed the original request 113 and has generated a response 115. The response 115 is persisted in its persistent storage 160. As a result, the original request 113 is in state D at the primary worker 150a. The new request 113' has not yet begun execution at the primary worker 150a and is therefore in state A.

The response 115 has also been replicated to the backup worker 150b and to the call cluster component 110. The backup worker 150b has stored the response 115 in its volatile memory 156 and has persisted the response to its persistent storage 160. The original request 113 is therefore in state H at the backup worker. The call cluster component 110 has stored the response 115 in its escrow buffer 114 and the request 113' in the call cluster's component's replay buffer 112 is in state B.

When the new request 113' begins execution at the primary worker 150a, the primary worker 150a recognizes that the new request 113' is associated with the same request identifier, rid as the response 115 and therefore does not execute the new request 113' because it is a duplicate. In some examples, the response 115 may be retransmitted to the call cluster component 110, which disregards the response 115 as a duplicate.

The cluster then proceeds according to its normal operation (as set forth in FIGS. 5-12).

3.6 Scenario 6: ta<tb<tr, Execution has Completed

In a sixth situation, a rollback time tr is at or after a request time ta, and the request has completed execution at a time tb also at or before the rollback time (i.e., ta≤tb≤tr). If the response was successfully provided to the call cluster component 110 (i.e., this request is in state B at the call cluster component), then the rollback request does not cause the request to be re-sent, nor does it cause removal of any response from the escrow buffer 114. That is, any requests associated with ta and any responses associated with tb are left unchanged.

But, if the response was not successfully provided to the call cluster component 110, the call cluster component 110 retransmits the request to the cluster 120. When the primary worker receives the retransmitted request, it begins execution of the retransmitted request (i.e., {rid, tc}) but detects that a response 115 associated with the request identifier, rid already exists. The retransmitted request is therefore not executed and the response generated by execution of the original request is retransmitted to the call cluster component 110. The call cluster component 110 receives the response with the response time tb, which is used to determine when the response can be sent from escrow at the call cluster component.

Figure 30:
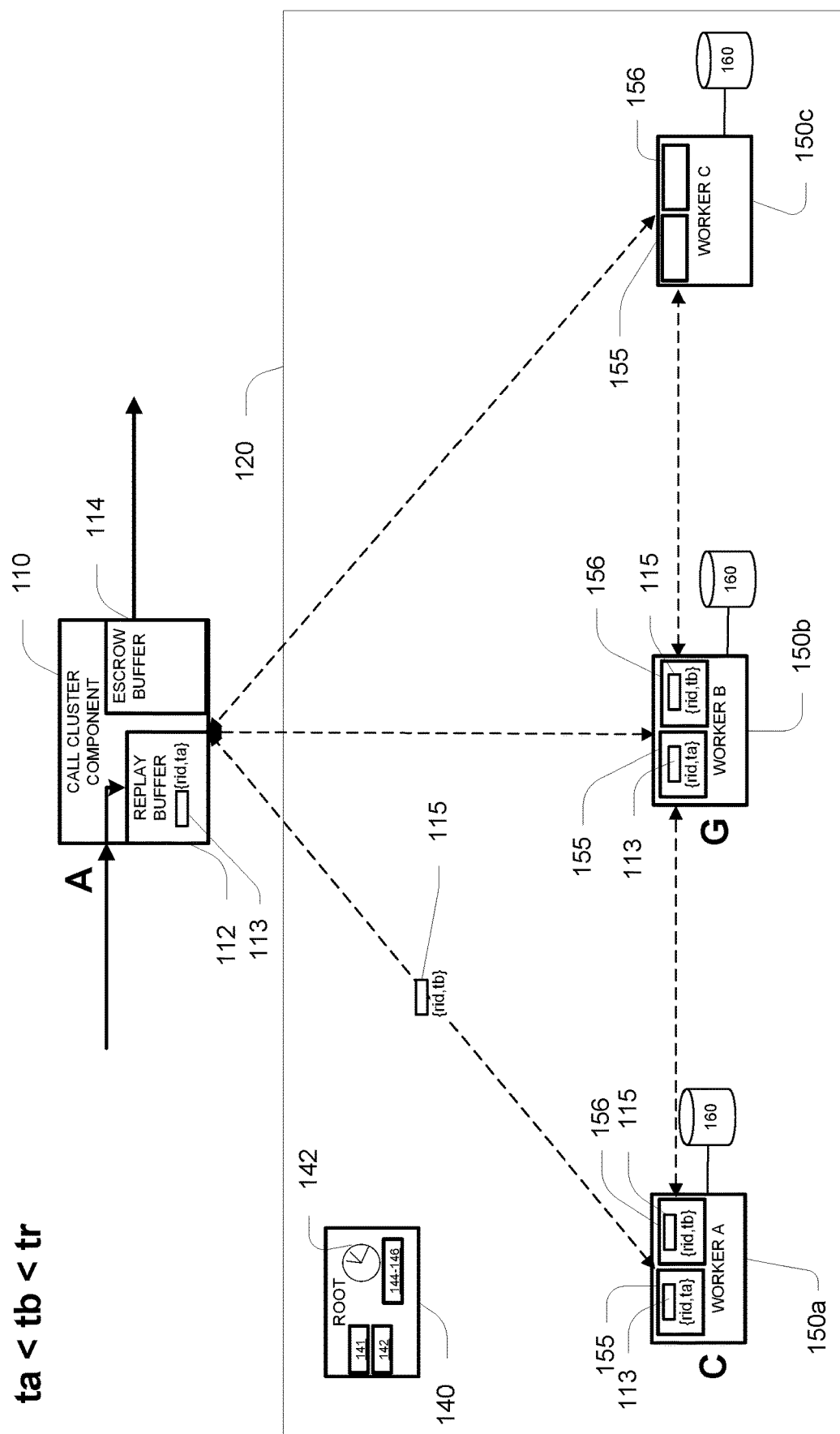
FIGS. 30 to 32 illustrate a sixth rollback procedure.
Figure 31:
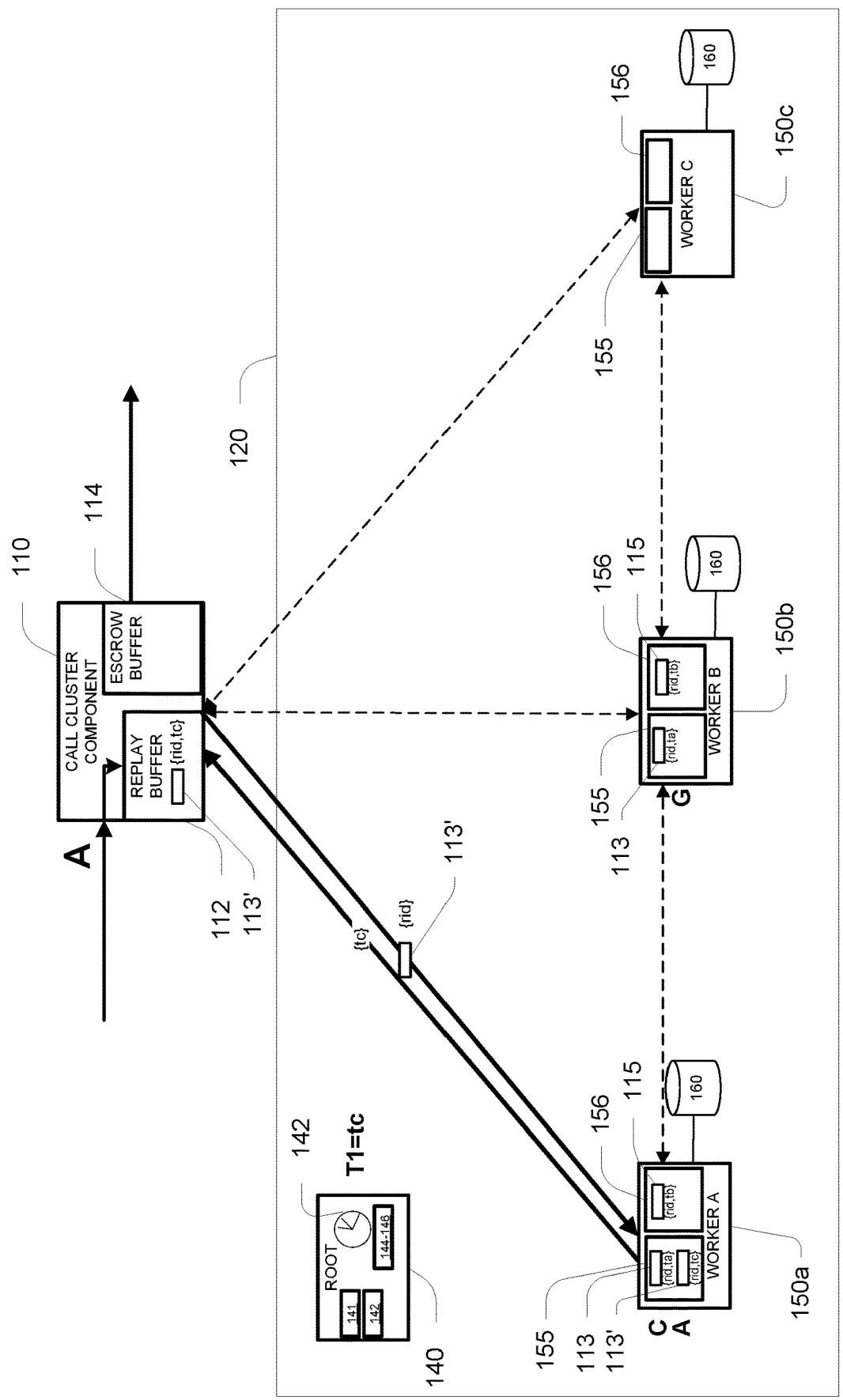
Figure 32:
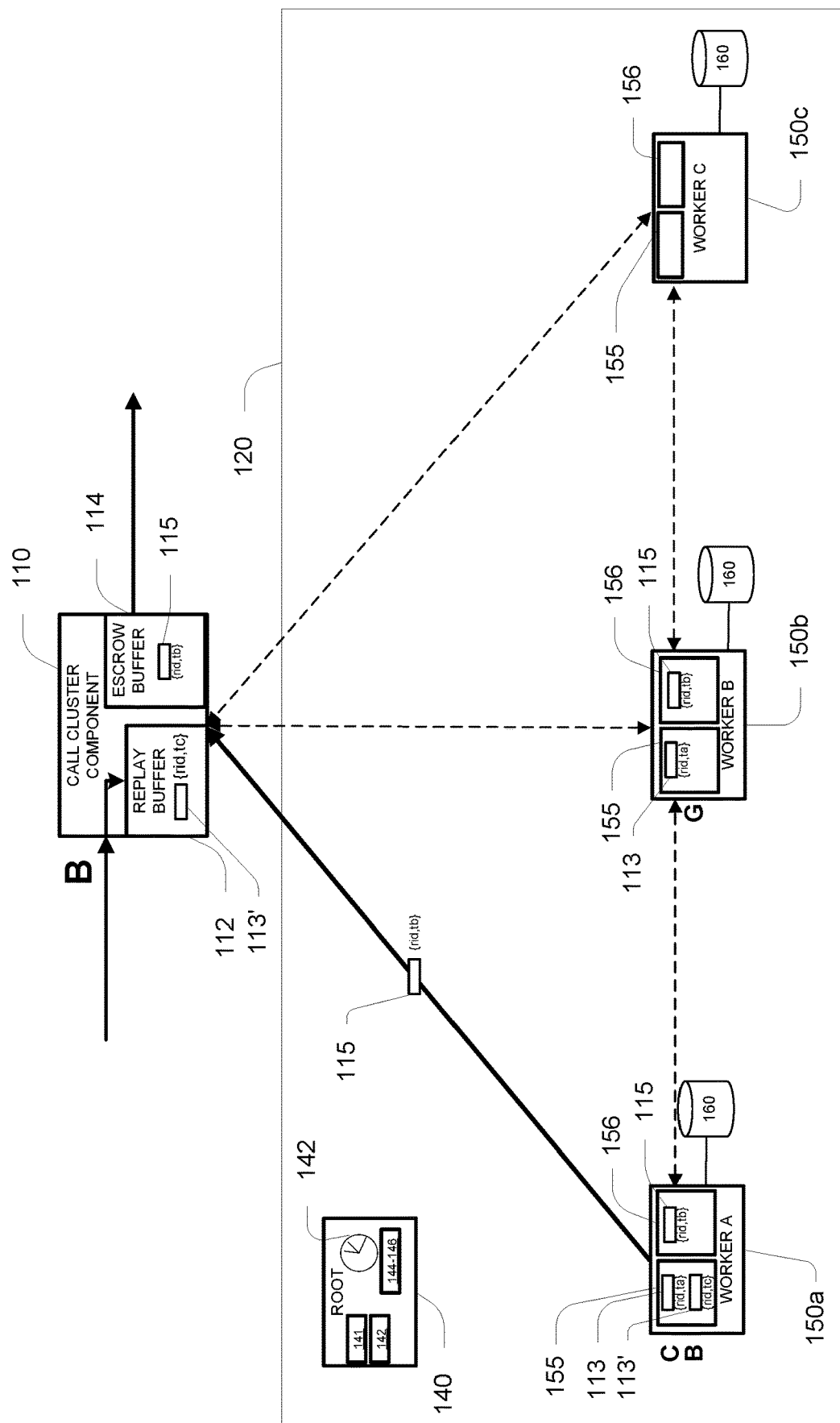

Referring to FIGS. 30-32, one example of the sixth rollback scenario is shown. In FIG. 30, an original request 113 issued at time ta is stored in the replay buffer 112 at the call cluster component 110. A response 115 to the original request 113 was generated at time tb but did not reach the escrow buffer 114 of the call cluster component 110. The request 113 is therefore in state A at the call cluster component 110.

In the cluster, the request 113 and the response 115 are stored in volatile memory 155, 156 at the primary worker 150a. The request 113 is therefore in state C at the primary worker 150a. The request 113 and the response 115 are also stored in volatile memory 155, 156 at the backup worker. The request is therefore in state G at the backup worker 150b.

A rollback request is received to roll the system back to a time ta<tb<tr. In FIG. 31, a new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'.

The new request 113' is sent to the primary worker 150a in the cluster 120. The primary worker 150a receives the new request 113' and queues the new request 113' in the volatile memory 155 for execution. The original request 113 stored in the volatile memory 155 of the primary worker 150a remains in state C and the new request 113' stored in the volatile memory 155 of the primary worker 150a is in state A.

Referring to FIG. 32, when the primary worker 150a begins execution of the new request, the primary worker 150a recognizes that the new request 113' has the same request identifier, rid as the original request 113 and that a response 115 associated with the request identifier, rid already exists at the primary worker 150a. The primary worker 150a therefore does not execute the new request 113' but instead retransmits the response 115 to the call cluster component 110. The call cluster component 110 receives the response 115 and stores it in the escrow buffer 114. With the response 115 stored in the escrow buffer 114 of the call cluster component 110, the call cluster component 110 is in state B.

The cluster then proceeds according to its normal operation (as set forth in FIGS. 5-12).

3.7 Scenario 7: ta<tr<tb, Execution has Completed

In a seventh situation, a rollback time tr is at or after a request time ta, and the request has completed execution at a time tb after the rollback time (i.e., ta≤tr<tb), the replication of the response between workers may not have been successful. The workers discard all responses 115 with times after tr. The requests 113 stored at the backup workers return to state F, and the requests 113 stored at the primary worker return to state B. The call cluster component 110 discards the all the responses 115 in the escrow buffer 114, returns the request 113 stored in the replay buffer 112 to state A, and resends the request 113 to the cluster 120 which reprocesses the request.

Figure 33:
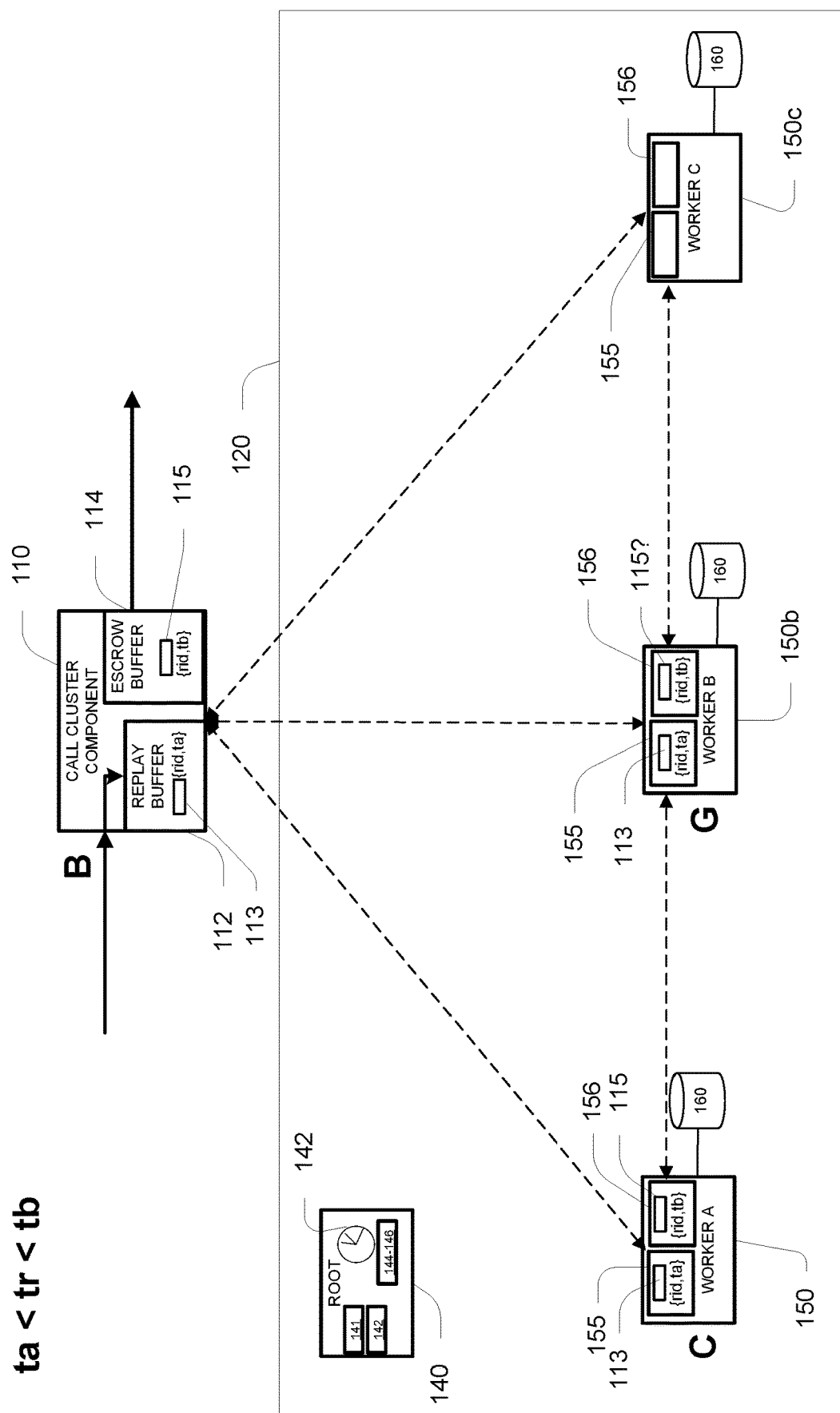
FIGS. 33 to 35 illustrate a seventh rollback procedure.
Figure 34:
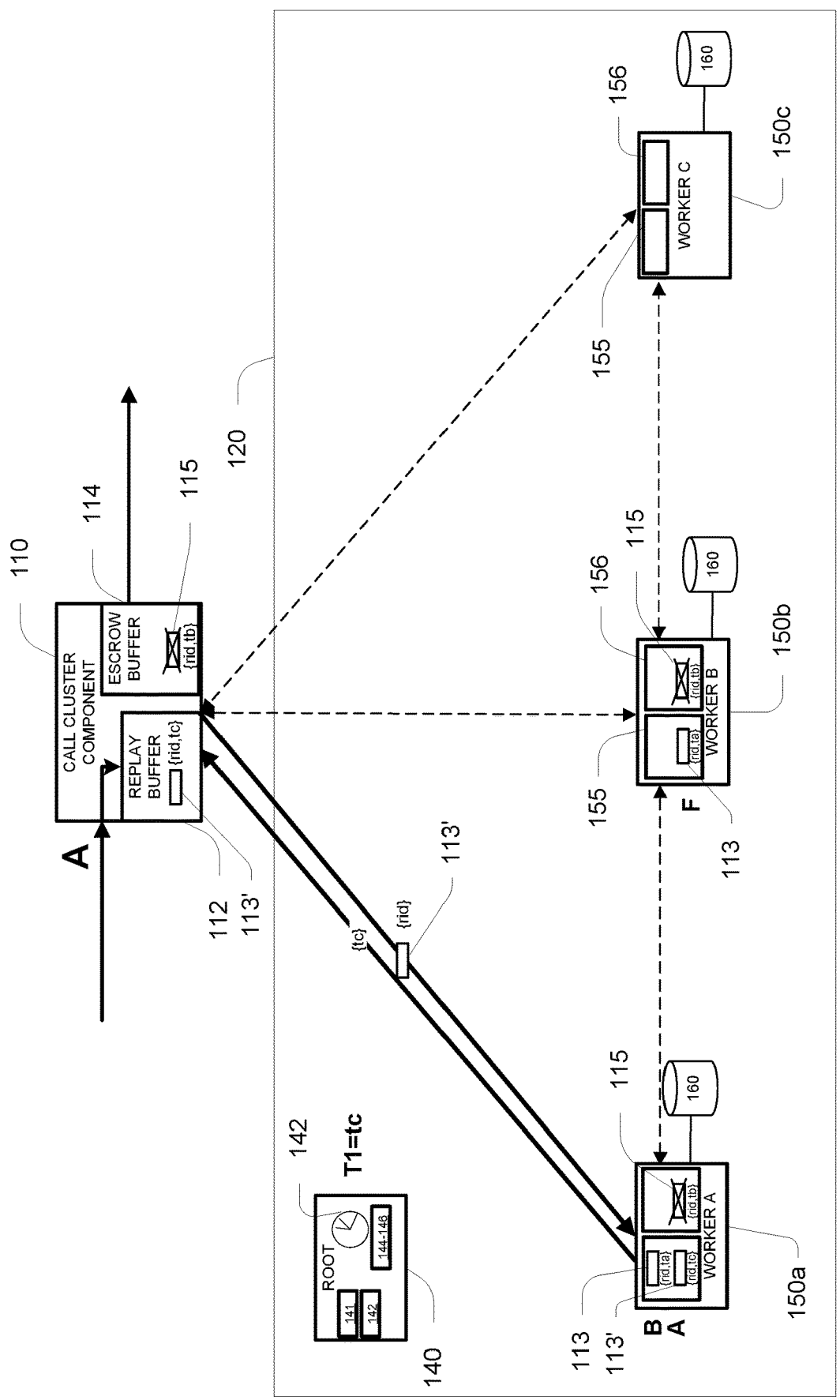
Figure 35:
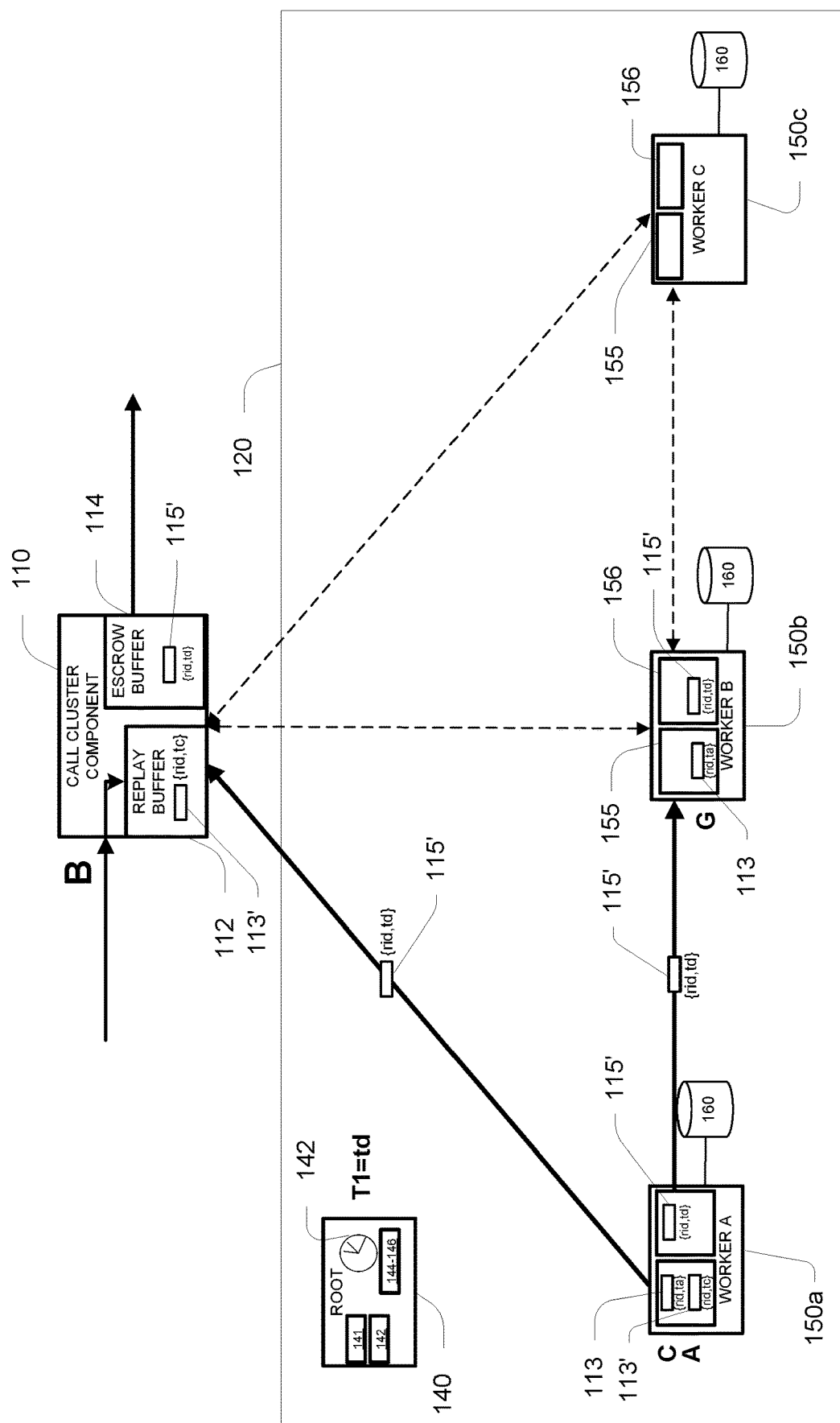

Referring to FIGS. 33-35, one example of the seventh rollback scenario is shown. In FIG. 33, a request 113 issued at time ta is stored in the replay buffer 112 at the call cluster component 110. A response to the request 115, generated at time tb is stored in the escrow buffer 114. The request 113 is therefore in state B at the call cluster component 110.

In the cluster 120, the request 113 and the response 115 are stored in volatile memory 155, 156 at the primary worker 150a. The request 113 is therefore in state C at the primary worker 150a. The request 113 is also stored in volatile memory 155, 156 at the backup worker 105, but the response 115 may or may not have been successfully replicated to the backup worker 150b. The request therefore may or may not be in state G at the backup worker 150b.

A rollback request is received to roll the system back to a time to <tr<tb. In FIG. 34, the response 115 stored in the escrow buffer 114 of the call cluster component 110 is removed. A new request 113' associated with the same request identifier (rid) as the original request 113 is issued to the cluster 120 by the call cluster component 110. At time tc, the new request 113' is received by the cluster 120 and is associated with the request time, tc. The cluster 120 notifies the call cluster component 110 of the request time, tc associated with the new request 113'. The new request 113' in the replay buffer 112 is in state A.

In the cluster 120, the backup worker 150b removes any response stored in its volatile memory 156 that is associated with a time after tr and therefore reverts to state F. The primary worker 150a returns to state B. The new request 113' is sent to the primary worker 150a. The primary worker receives the new request 113' and queues the new request 113' behind the original request 113 for execution. The new request 113' stored in the volatile memory 155 of the primary worker 150a is in state A.

In FIG. 35, the primary worker 150a completes execution of the original request 113 and generates a new response 115' at time td. The primary worker 150a sends the new response 115' to the backup worker 150b and to the call cluster component 110, causing the state of the original request 113 stored in the volatile memory of the primary worker 150a to transition to state C. The backup worker 150b receives the new response 115' and stores the new response 115' in its volatile memory 155, causing the original request 113 stored in the backup worker's volatile memory 155 to transition to state G. The call cluster component 110 receives the new response 115' and stores it in the escrow buffer 114, causing the new request 113' stored in the replay buffer 112 to transition to state B.

When the new request 113' begins execution at the primary worker 150a, the primary worker 150a recognizes that the new request 113' has the same request identifier, rid as the original request 113 and therefore does not execute the new request 113' because it is a duplicate.

The cluster then proceeds according to its normal operation (as set forth in FIGS. 5-12).

3.8 Scenario 8: ta<tr<tb, Execution has Completed

Finally, there in an eighth situation, a worker that is processing a request as a primary is lost (e.g., it is known to fail). Very generally, any request at a backup worker that is waiting for the lost primary to provide a response (i.e., the backup is in state F), that backup worker is promoted to be a primary. When the root 140 detects that a worker is lost, for example, by failing to receive a reply to a message from that worker, the root initiates a rollback to a time tr equal to the last replicated (i.e., tr=T2) time. When a backup receives a rollback request to time tr, which may be accompanied by the new partition information to accommodate the lost worker the backup begins to act as the new primary by changing the state of the request to state A in which it is waiting for resources to execute the request.

Figure 36:
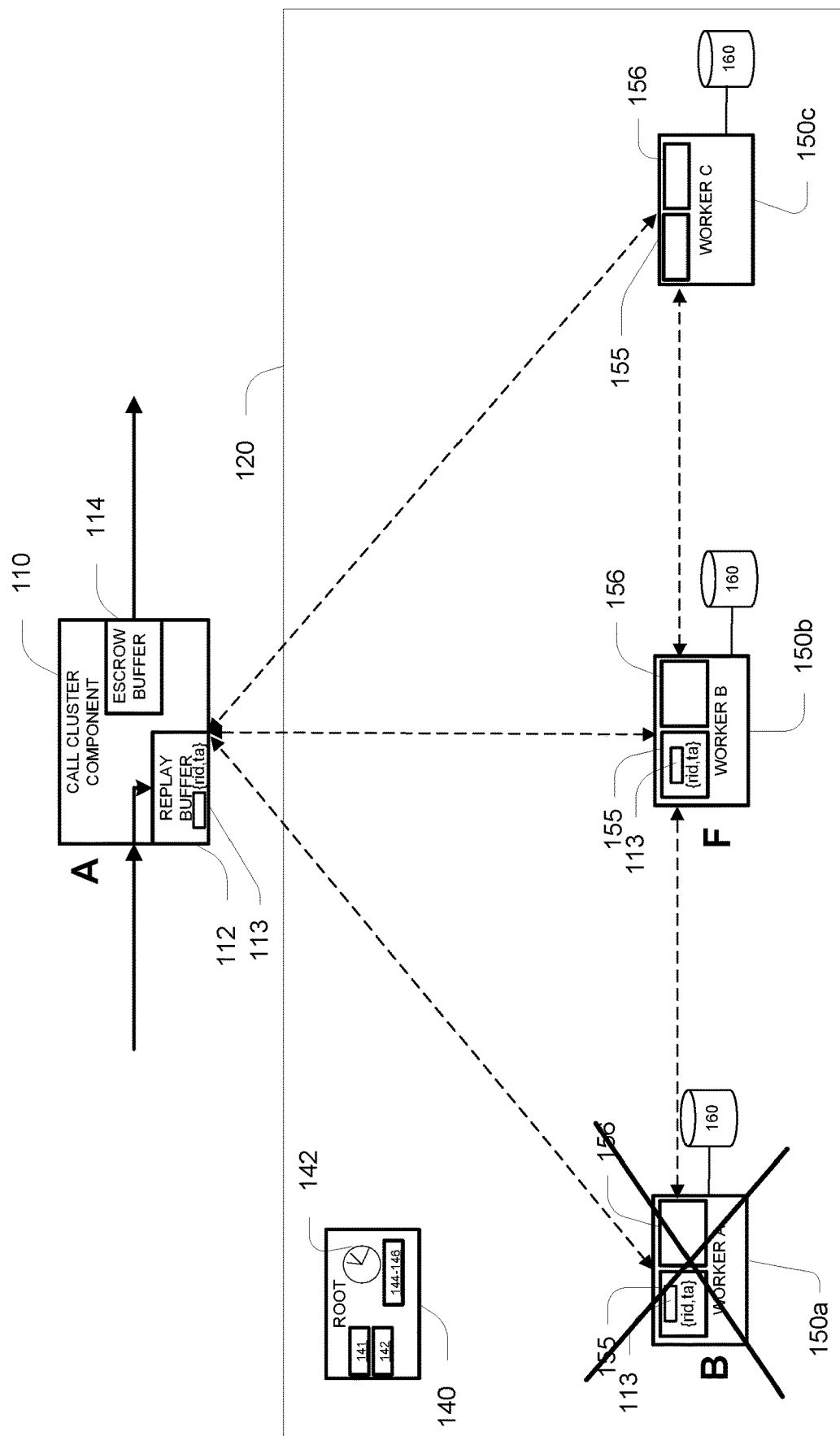
FIGS. 36 to 37 illustrate an eighth rollback procedure.
Figure 37:
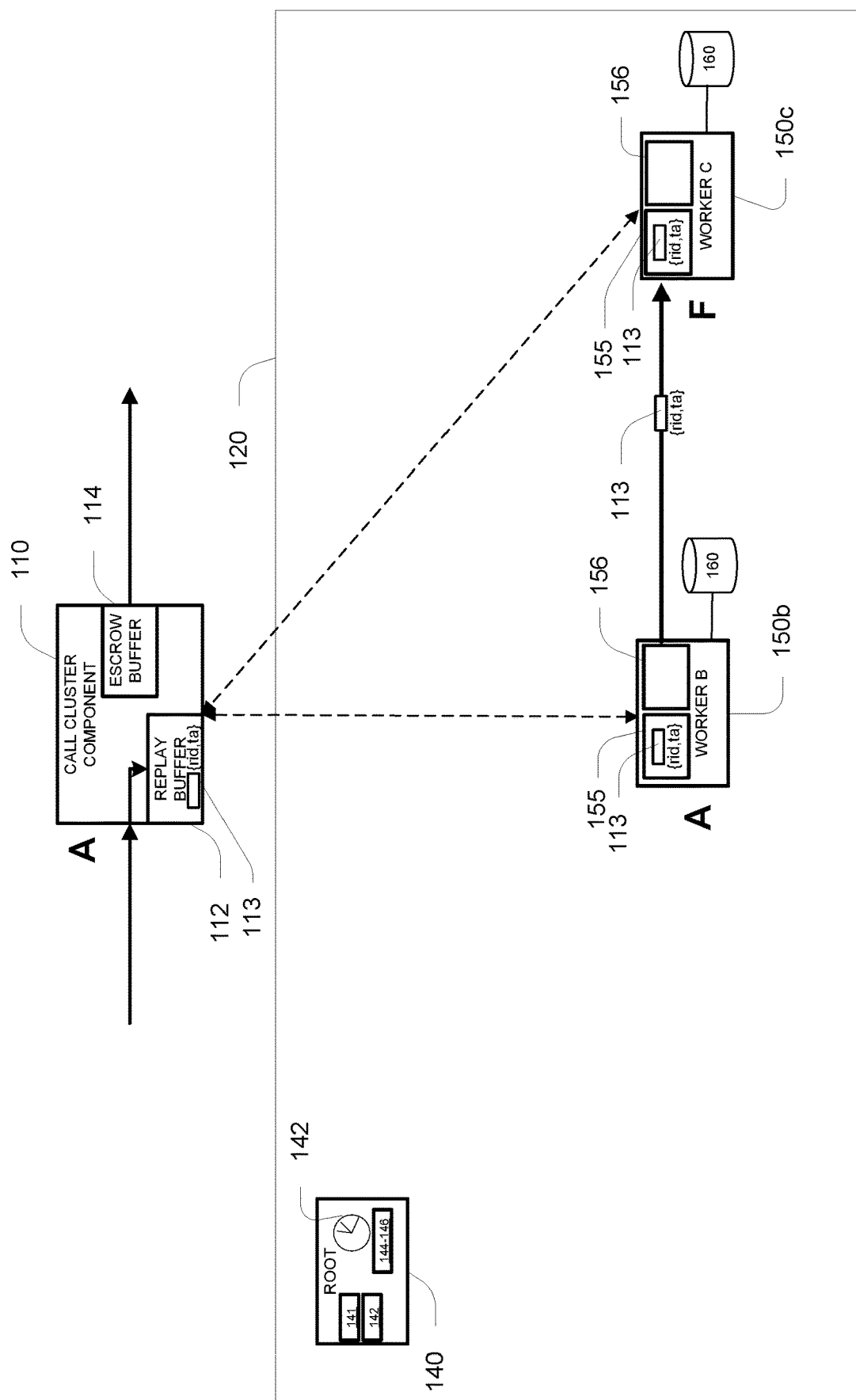

Referring to FIGS. 36-37, one example of the eighth rollback scenario is shown. In FIG. 36, a request 113 issued at time ta is stored in the replay buffer 112 at the call cluster component 110 and is in state A. The request 113 is stored in the volatile memory 155 at the primary worker 150a and is in state B because it has begun but has not finished execution. The request is also stored at the backup worker 150b and is in state F. During execution of the request 113, the primary worker 150a fails or is lost.

In FIG. 37, the root has requested a rollback to time tr equal to the last replicated time. At that time, the backup worker 150b is promoted to be the primary worker 150a and changes its state to state A. Another worker 150c is assigned as the backup worker in state F.

The cluster then proceeds according to its normal operation (as set forth in FIGS. 5-12).

4 Root Node

Turning now to the operation of the root 140, as introduced above, the root periodically increments the current working time (interval) T1 144. Generally, when the root updates the working time, it distributes (e.g., broadcasts) the tuple of times (T1, T2, T3) 144-146 to all the workers. In response, the workers provide information to the root based on which it may update the T2 and/or T3 times.

Each worker maintains a set of counters 151-152 associated with particular working times. One counter 151 is associated with a working time t1, referred to as Sent(t1) counts the number of communications from that worker for requests with request times t1 that have been sent to backup workers, and the number of responses with response times t1 that have been sent to backup workers. In FIG. 4, Sent(ta) is updated in state A for each request with request time ta that is sent to a backup worker, and Sent(tb) is incremented for each response generated at time tb that is sent for replication at a backup worker. Note that the Sent( ) counters are not incremented for messages sent from the worker to the call cluster component. Another counter 152, Rec(t1), counts the number of communications received at a worker associated with the time t1. In particular, a backup worker increments Rec(ta) when it receives a replication of a request with request time ta when it enters state F, and increments Rec(tb) when it receives replication of a response generated at time tb when it enters state G. Each worker has its own local copy of these counters, denoted Sentw(t) and Recw(t) for worker w. It should be evident that to the extent that all communications that are sent associated with a time t1 are also received at their destinations, that the aggregated sum of Sentw(t) over all workers w is equal to the aggregated sum of Recw(t) over workers w.

From time to time, for instance in response to receiving a broadcast of the current times (T1, T2, T3) from the root 140, each of the workers 150 sends its current counts Sent(t) 151 and Rec(t) 152 for all times greater than the replication time T2. These counts are received at the root and aggregated such that the root determines the sum of Sent(t) and Rec(t) for each time t greater than T2 and stored them counter 141 and 142 in association with the corresponding times. If Sent(T2+1) is equal to Rec(T2+1), then all transmissions from time T2+1 have been received, and T2 is incremented to become the next replication time. This process is repeated until Sent(T2+1) is not equal to Rec(T2+1) or T2+1 reaches T1. This incremented T2 time (145) is then used in the next broadcast from the root.

As introduced above, data updates at the workers are journaled, first in volatile memory, with the journal being written to persistent storage from time to time. Each worker is free to make journaled changes in persistent memory permanent for changes up to the replication time T2. In general, each worker, w, has had the opportunity to make permanent all changes through a time T3(w), generally with different workers having reached a different time. In addition to returning Rec( ) and Sent( ) to the root in response to the broadcast of the current times, each worker also returns its T3(w) time, which is aggregated according to a min( ) operation either at the root or on the communication path back to the root. That is, the root determines T3=minw T3(w), and then distributes this new value of T3 the next time it distributes the current times.

In some embodiments, the root distributes the time tuples (T1, T2, T3) in direct (e.g., unicast) communication between the root and each of the workers. In other embodiments, the tuple is distributed in another manner, such as a flooding-based broadcast. In another embodiment, the tuple is distributed along a predetermined tree-structured distribution network in which each recipient of the tuple forwards the tuple to multiple further recipients, such that ultimately all the workers have received the time tuple.

Aggregation of the counts from the workers may be performed by unicast communication between each worker and the root node, with the root performing the complete summation over all the workers. As a more efficient solution, the counts may be sent back along the same path as the time tuple, with intermediate nodes in the paths performing partial aggregations of the sums of the counts, thereby distributing the burden of the summation with the root nevertheless obtaining the sum of the counts over all the workers.

In an alternative mode of operation, responses may be released from the call cluster component when the response time is replicated rather than persistent. In this way, the response may be provided to the graph with less delay, with the possibility that the response may not yet per persistent in the cluster storage.

As introduced above, the storage of the responses of execution of the requests are stored in a versioned data structure. In one such data structure, each update of a data item is stored as a separately recoverable version, and that version is tagged with the time associated with the update. For example, the data structure may be stored, at least conceptually, for each access key, as a list of tuples (tb, value), where tb is the time of the update of the value. The values for different times may share substructure or use other optimizations of storage. In some examples, the values are stored based on edits of the data values between times. As one example, the values may be represented as a tree-based structure, and each version may be stored as a "forward" incremental operation sufficient to create a next version from a previous version, or as a "backward" incremental operation sufficient to reconstruct the previous version from a current version. As discussed above, this sort of versioned data structure permits rolling back all updates after a rollback time. Rather than maintain all updates to a data item, only updates relative to the start of an update time are retained, so that that a rollback can be accomplished to the start of any update time.

It should be recognized that after the root increments the replication time T2, a worker will not be asked to roll back to a version at or prior to that time. Therefore, an optimization of the versioned data structure is that versions at or prior to the replication time T2 can be removed from the data structure.

In some embodiments, some requests are "lightweight" in the sense that their execution time is small and therefore execution of the request at the backup workers may consume fewer resources that replication of the response from the primary worker to the backup workers. In such an embodiment, the replication of the response from the primary to the backup(s) is not performed. Each worker may complete the processing at a different time. To maintain synchronization of the data among the workers, the primary distributes the completion time, tb, as described above, and the backup workers treat their locally-computed responses as if they were computed at that time.

In an alternative embodiment, the call cluster component participates in the cluster in the sense that it receives the time tuples from the root, and returns Sent( ) and Rec( ) counts to the root. In this embodiment, the call cluster component assigns the request time for a request, which is used by the workers during replication of the request. When a rollback occurs, because the call cluster component knows the request times for the requests it is holding, only has to resend the requests after the rollback time and does not discard responses generated at or before the rollback time. Operation of the workers is modified to accommodate this operation of the call cluster component.

5 Alternatives

More generally, in rollback scenarios 4-8 above, where ta<tr, when the call cluster component 110 re-transmits the request, it is not aware (nor does it care) that the original request was transmitted at time ta. The cluster 120, on the other hand, needs to account for the request time of the original request, because it uses that time to determine whether or not to roll back. So, when the call cluster component 110 re-sends a request (with request identifier rid) to the cluster 120 such that ta<tr<tc, the request is received at the primary worker 150a and associated with the time tc. The primary worker 150a forwards the request to the backup worker 150b. In this situation the primary worker may execute the original request (i.e., {rid, ta}) before it executes the re-sent request (i.e., {rid,tc}). When the primary worker 150a proceeds to execute the re-sent request (i.e., {rid, tc}), it will treat the re-sent request as a duplicate because the response for the original request (i.e., {rid, ta}) has already been persisted.

In some examples, a request spawns subsequent tasks (sometimes referred to as 'task chaining'). In such examples, the response for the request is not generated until after the spawned tasks are complete. In some examples, if a response to the request {rid, ta} has been stored, it returns its response to the call cluster component. But if a response to the request {rid, ta} doesn't yet exist because the request {rid, ta} hasn't yet completed, a subsequent request {rid,tc} with a duplicate rid is ignored because the cluster knows that the original request will eventually complete and generate a response, which is returned to the call cluster component.

In the examples described above, when the cluster receives a request, the cluster associates a time (e.g., ta) with the request and then notifies the call cluster component of that time. The call cluster component associates the time with the request stored in its reply buffer. The times associated with the requests in the replay buffer of the call cluster component can be used by the call cluster component to selectively replay requests in the case of a rollback. But, in some examples, neither the cluster nor the call cluster component associates requests with times. In those examples, the call cluster component is less selective when replaying requests in the case of a rollback scenario. For example, the call cluster component may systematically replay all requests in its replay buffer in the case of a rollback request.

6 Implementations

The computing cluster management approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing tasks in a distributed data processing system including a plurality of processing nodes, the method including:
   processing a plurality of sets of tasks using two or more of the plurality of processing nodes, each set of tasks configured to generate a corresponding set of results and being associated with a corresponding time interval of a plurality of time intervals,
   maintaining, at a first processing node of the plurality of processing nodes, a plurality of counters, the plurality of counters including:
      a working counter indicating a current time interval of the plurality of time intervals in the distributed data processing system, and
      a replication counter indicating a time interval of the plurality of time intervals for which at least one of (1) all tasks associated with that time interval, or (2) all corresponding results associated with that time interval, are replicated at multiple processing nodes of the plurality of processing nodes, and
   providing messages from the first processing node to the other processing nodes of the plurality of processing nodes, the messages including a value of the working counter and a value of the replication counter.

2. The method of claim 1 wherein the processing includes performing computations associated with at least some tasks at a primary processing node of the plurality of processing nodes and performing computations associated with replicas of the at least some tasks at one or more backup processing nodes of the plurality of processing nodes.

3. The method of claim 2 wherein performing computations associated with a first task at the primary processing node includes generating a first result at the primary processing node, and performing computations associated with a replica of the first task at the backup processing node includes generating the first result at the backup processing node.

4. The method of claim 3 wherein the computations associated with the first task performed at the primary processing node and the computations associated with the replica of the first task performed at the backup processing node both begin after a commit operation indicating that both the first task and the replica of the first task have been persistently stored.

5. The method of claim 3 wherein the first result includes a modified version of original data that has been replicated at the primary processing node and the backup processing node.

6. The method of claim 3 wherein the computations associated with the first task performed at the primary processing node are identical to the computations associated with the replica of the first task performed at the backup processing node.

7. The method of claim 6 wherein the computations associated with the first task performed at the primary processing node and the computations associated with the replica of the first task performed at the backup processing node are deterministic and do not depend on which of the multiple processing nodes perform the computations.

8. The method of claim 2 wherein the replication counter indicates a time interval of the plurality of time intervals for which all tasks associated with that time interval and all corresponding results associated with that time interval are replicated at multiple processing nodes of the plurality of processing nodes.

9. The method of claim 1 wherein the processing includes performing computations associated with at least some tasks at a primary processing node of the plurality of processing nodes while a replica of the task remains dormant at a backup processing node, and sending a result corresponding to a task for which computations were performed from the primary processing node to the backup processing node.

10. The method of claim 9 wherein performing computations associated with a first task at the primary processing node includes generating a first result, and the first result is sent to from the primary processing node to the backup processing node after the first task has been completed at the primary processing node.

11. The method of claim 10 wherein the first result includes a modified version of original data that has been replicated at the primary processing node and the backup processing node.

12. The method of claim 9 wherein the replication counter indicates a time interval of the plurality of time intervals for which all tasks associated with that time interval and all corresponding results associated with that time interval are replicated at multiple processing nodes of the plurality of processing nodes.

13. A non-transitory computer-readable medium having software stored thereon, the software for processing tasks in a distributed data processing system including a plurality of nodes, the software including instructions for causing a computing system to:
   process a plurality of sets of tasks using two or more of the plurality of processing nodes, each set of tasks configured to generate a corresponding set of results and being associated with a corresponding time interval of a plurality of time intervals,
   maintain, at a first processing node of the plurality of processing nodes, a plurality of counters, the plurality of counters including:
      a working counter indicating a current time interval of the plurality of time intervals in the distributed data processing system, and
      a replication counter indicating a time interval of the plurality of time intervals for which at least one of (1) all tasks associated with that time interval, or (2) all corresponding results associated with that time interval, are replicated at multiple processing nodes of the plurality of processing nodes, and
   provide messages from the first processing node to the other processing nodes of the plurality of processing nodes, the messages including a value of the working counter and a value of the replication counter.

14. An apparatus for processing data, the apparatus including:
   a distributed data processing system including a plurality of processing nodes, each processing node including at least one processor; and
   a communication medium connecting the plurality of processing nodes for sending and receiving information between processing nodes of the plurality of processing nodes;
   wherein the distributed data processing system is configured to:
   process a plurality of sets of tasks using two or more of the plurality of processing nodes, each set of tasks configured to generate a corresponding set of results and being associated with a corresponding time interval of a plurality of time intervals,
   maintain, at a first processing node of the plurality of processing nodes, a plurality of counters, the plurality of counters including:
      a working counter indicating a current time interval of the plurality of time intervals in the distributed data processing system, and
      a replication counter indicating a time interval of the plurality of time intervals for which at least one of (1) all tasks associated with that time interval, or (2) all corresponding results associated with that time interval, are replicated at multiple processing nodes of the plurality of processing nodes, and
   provide messages from the first processing node to the other processing nodes of the plurality of processing nodes, the messages including a value of the working counter and a value of the replication counter.

* * * * *